(12) United States Patent
Clavequin et al.

(10) Patent No.: US 7,231,538 B2
(45) Date of Patent: Jun. 12, 2007

(54) SYNCHRONIZED COMMUNICATION BETWEEN INTEGRATED CIRCUIT CHIPS

(75) Inventors: Jean-Paul Clavequin, Sevres (FR); Pascal Couteaux, Ezanville (FR); Philippe Diehl, Versailles (FR)

(73) Assignee: Mentor Graphics (Holdings) Ltd., Wilsonville, OR (US)

( * ) Notice: Subject to any disclaimer, the term of this patent is extended or adjusted under 35 U.S.C. 154(b) by 516 days.

(21) Appl. No.: 10/702,042

(22) Filed: Nov. 6, 2003

(65) Prior Publication Data

US 2005/0102545 A1  May 12, 2005

(51) Int. Cl.
*G06F 1/12* (2006.01)
*G06F 13/42* (2006.01)
(52) U.S. Cl. ...................... 713/401; 713/400
(58) Field of Classification Search ............... None
See application file for complete search history.

(56) References Cited

U.S. PATENT DOCUMENTS

| 5,532,632 | A * | 7/1996 | Kent ...................... 327/141 |
| 6,636,978 | B1 * | 10/2003 | Kirihata et al. ............ 713/400 |
| 6,665,218 | B2 * | 12/2003 | Meier et al. ........... 365/189.12 |
| 6,690,201 | B1 * | 2/2004 | Simkins et al. ............... 326/93 |
| 2003/0219090 | A1 * | 11/2003 | Baba ......................... 375/376 |

OTHER PUBLICATIONS

"Data to Clock Phase Alignment", Nick Sawyer, Xilinx Application Note, Apr. 4, 2002.

* cited by examiner

*Primary Examiner*—Rehana Perveen
*Assistant Examiner*—Stefan Stoynov
(74) *Attorney, Agent, or Firm*—Banner & Witcoff, Ltd.

(57) ABSTRACT

In emulation systems having a plurality of chips, data communicated between the chips needs to be synchronized. A receiver chip may push or pull on incoming data from an emitter chip in order to synchronize it with a receiver clock. Unexpected latency on the link between the emitter and receiver chips may also be adjusted for.

22 Claims, 19 Drawing Sheets

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| BP_N | RLA | FLA | WEXPLAT | | | RDPA | FDPA | LPTR | WPTR | | | | | MUXIN | AUTO |

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| XXXXXXXXX | | | SYNOK | LATCK | PHOK | FSM_STATE | | | RLAT | | | RPTR | | | |

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| BP_N | RLA | FLA | WEXPLAT ||| RDPA | FDPA | LPTR | WPTR ||||| MUXIN | AUTO |
| 0 | X | X | X | X | X | X | X | X | X | X | X | X | X | X | X |

FIG. 36

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| BP_N | RLA | FLA | WEXPLAT ||| RDPA | FDPA | LPTR | WPTR ||||| MUXIN | AUTO |
| 1 | X | 0 | EXPECTED LATENCY ||| X | 0 | X | X | X | X | X | X | X | 1 |

FIG. 37

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| BP_N | RLA | FLA | WEXPLAT ||| RDPA | FDPA | LPTR | WPTR ||||| MUXIN | AUTO |
| 1 | 0 | 0 | X | X | X | 0 | 1 | 1 | 0 | 0 | 0 | 0 | 0 | 0 | 0 |

FIG. 38

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| BP_N | RLA | FLA | WEXPLAT ||| RDPA | FDPA | LPTR | WPTR ||||| MUXIN | AUTO |
| 1 | 0 | 0 | X | X | X | 1 | 0 | 0 | 0 | 0 | 0 | 0 | 0 | 0 | 0 |

FIG. 39

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| BP_N | RLA | FLA | WEXPLAT ||| RDPA | FDPA | LPTR | WPTR ||||| MUXIN | AUTO |
| 1 | 0 | 0 | X | X | X | 0 | 0 | 1 | X | X | X | X | X | 1 | 0 |

FIG. 40

| b15 | b14 | b13 | b12 | b11 | b10 | b9 | b8 | b7 | b6 | b5 | b4 | b3 | b2 | b1 | b0 |
|-----|-----|-----|-----|-----|-----|-----|-----|-----|-----|-----|-----|-----|-----|-----|-----|
| BP_N | RLA | FLA | WEXPLAT | | | RDPA | FDPA | LPTR | WPTR | | | | | MUXIN | AUTO |
| 1 | 0 | 0 | X | X | X | 1 | 0 | 0 | X | X | X | X | X | 0 | 0 |

FIG. 41

| b15 | b14 | b13 | b12 | b11 | b10 | b9 | b8 | b7 | b6 | b5 | b4 | b3 | b2 | b1 | b0 |
|-----|-----|-----|-----|-----|-----|-----|-----|-----|-----|-----|-----|-----|-----|-----|-----|
| BP_N | RLA | FLA | WEXPLAT | | | RDPA | FDPA | LPTR | WPTR | | | | | MUXIN | AUTO |
| 1 | 1 | 0 | EXPECTED LATENCY | | | 1 | 0 | 0 | X | X | X | X | X | 0 | 0 |

FIG. 42

| b15 | b14 | b13 | b12 | b11 | b10 | b9 | b8 | b7 | b6 | b5 | b4 | b3 | b2 | b1 | b0 |
|-----|-----|-----|-----|-----|-----|-----|-----|-----|-----|-----|-----|-----|-----|-----|-----|
| BP_N | RLA | FLA | WEXPLAT | | | RDPA | FDPA | LPTR | WPTR | | | | | MUXIN | AUTO |
| 1 | 0 | 0 | X | X | X | 1 | 0 | 0 | X | X | X | X | X | 0 | 0 |

FIG. 43

| b15 | b14 | b13 | b12 | b11 | b10 | b9 | b8 | b7 | b6 | b5 | b4 | b3 | b2 | b1 | b0 |
|-----|-----|-----|-----|-----|-----|-----|-----|-----|-----|-----|-----|-----|-----|-----|-----|
| BP_N | RLA | FLA | WEXPLAT | | | RDPA | FDPA | LPTR | WPTR | | | | | MUXIN | AUTO |
| 1 | 1 | 0 | 1 | 1 | 1 | 1 | 0 | 0 | X | X | X | X | X | 0 | 0 |

FIG. 44

SYNCHRONIZED COMMUNICATION BETWEEN INTEGRATED CIRCUIT CHIPS

FIELD OF THE INVENTION

Aspects of the present invention are directed to synchronization and/or latency adjustment of data sent between integrated circuit chips, such as between emulation chips in an emulation system.

BACKGROUND

Emulator custom chips have a need to exchange data at relatively high data rates, even though the chips may be separated from each other by relatively long distances, such as beyond tens of centimeters. A major hurdle to overcome in any such chip-to-chip communication link is synchronization. Clock signals are typically used to provide some measure of synchronization. Signals are sent and received in synchronicity with a clock. Clocks may be global or local. A global board-level clock is distributed to a plurality of chips, however due to propagation delays it may arrive at each chip at slightly different times. This is called clock skew. Local clocks are generated by the chips themselves (although they may be derived from external signaling such as a global clock). However, local clocks also suffer from the skew problem between chips. Even if chip-to-chip data transfer is source-synchronous, problems of synchronization can occur at the receiver flip-flop due to different parameters such as jitter/noise at the chip or board level, skew between the emitter and receiver clocks, propagation delay between the emitter chip and the receiver chip.

When data is received that is not synchronized with the clock that the receiver is using, data can be distorted or even lost. Various approaches have been taken to resolve the inter-chip synchronicity problem. In one approach, the clock is adjusted to match the timing of the incoming data. In particular, incoming data from another chip is oversampled by four different receiver clocks. The clock that works best is used. In general, some of the previous approaches have required a relatively large amount of power and area on an integrated circuit chip, and are unable to sufficiently correct for unexpected latencies between chips.

Improved systems are needed for establishing and/or maintaining synchronization between integrated circuit chips. Such a need is particularly felt in the field of circuit design emulation, where a single synchronized operation may be performed between different chips in phase with a specific clock cycle. Such improved systems should preferably be able to perform such synchronization despite unexpected latencies that occur in the data paths between chips.

SUMMARY OF THE INVENTION

Aspects of the present invention are directed to synchronizing incoming data with a receiver clock in an efficient way. Incoming data may be delayed by "pushing" or "pulling" on the incoming data to better synchronize it with respect to transition edges in the receiver clock. For example, where the rising edges of the receiver clock are the active transition edges, then the incoming data may be pushed or pulled until the transition edges of the incoming data match up with the falling edges of the receiver clock. This would reduce the possibility of setup/hold violations occurring.

Further aspects of the present invention are directed to sampling the incoming data at strategic times to gain information about the current synchronization (or lack thereof) of the incoming data relative to the receiver clock. If the sample times are picked judiciously, then sufficient information is provided to make such a determination. The incoming data may be delayed, and the delay may be dynamically adjusted depending upon the sampled values.

Still further aspects of the present invention are directed to making decisions whether to increase, decrease, or maintain a particular delay of the incoming data. Such decisions may be made based on sampled values of the incoming data and/or based on a decision history. Using previous decisions may help to "smooth" the decisions to reduce the possibility of making a wrong decision.

Still further aspects of the present invention are directed to adjusting for unexpected latency in chip-to-chip links. Information about an expected latency of a chip-to-chip link may be provided to a receiving chip, however the actual latency is somewhat unpredictable and is therefore measured. The system may measure the actual latency on a particular chip-to-chip link using, for example, a synchronized starter signal that is sent to both the emitter and receiver chips. The receiver chip on that link may then take the different between the actual and expected latency into account.

These and other aspects of the invention will become apparent to one of ordinary skill in the art upon a reading of the following description, drawings, and the claims.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 16 and 17 are illustrative waveforms showing how latency may be accounted for.

FIGS. 36-44 show illustrative protocols that may be used.

DETAILED DESCRIPTION OF ILLUSTRATIVE EMBODIMENTS

Inter-Chip Communication

Figure 1:
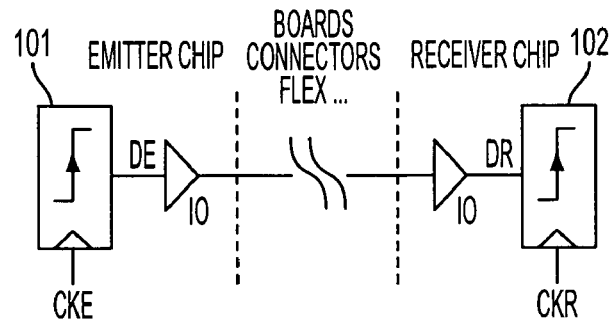
FIG. 1 is a functional block diagram of an illustrative embodiment of a pair of intercommunicating integrated circuit chips.

Referring to FIG. 1, an illustrative interconnection between a first emulator integrated circuit chip 101 and a second emulator integrated circuit chip 102 in an emulator system is shown. The emulator chip 101 will be referred to as an emitter chip since in this example it is emitting a signal DE, which is emitted in synchronization with emitter chip clock CKE. The emulator chip 102 will be referred to as a receiver chip since in this example it is receiving a signal DR. Signal DR is a delayed version of signal DE. The receiver chip 102 operates on its own receiver chip clock CKR, which is typically of the same frequency 1/T as emitter chip clock CKE, although it may be skewed relative to emitter chip clock CKE. The emitter chip clock CKE and the receiver chip clock CKR are of the same frequency. However, any phase difference between CKE and CKR may be an unknown.

Figure 2:
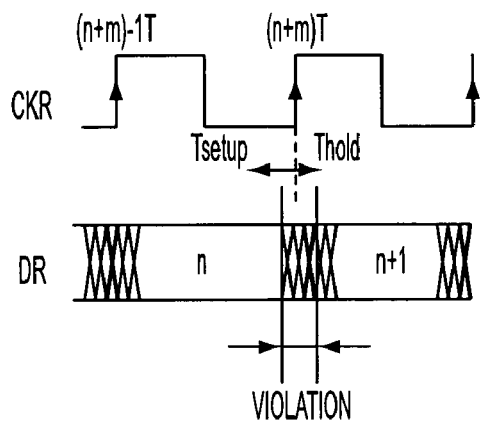
FIG. 2 is an illustrative waveform showing how the chips of FIG. 1 may become out of synchronization.

Referring to FIG. 2, the timing of received signal DR relative to receiver chip clock CKR is shown. In this example, DR is sampled by the receiver chip 102 on the rising edged of clock CKR. However, DR may alternatively or additionally be sampled on the falling edges of clock CKR. Rising and falling edges are generically referred to as transition edges. The clock CKR transition edge that the receiver flip-flop samples on is referred to as the active transition edge, and the other transition edge of clock CKR is referred to as the inactive transition edge. For data in signal DR to be reliably received by the receiver chip 102, signal DR should be of a stable value (bit 0 or 1) during both a setup time $T_{setup}$ (immediately prior to a CKR active transition edge) and a hold time $T_{hold}$ (immediately following the CKR active transition edge) of a receiver flip-flop, collectively referred to as the setup/hold time period. However, in this example, signal DR has a transition, and is thus unstable, during the $T_{setup}$ and $T_{hold}$ times at the (n+m)T CKR transition edge, where n is the number of the clock cycle that DE is sent, and m is the delay introduced between the emitter chip 101 and the receiver chip 102. Therefore, there is a large probability that the data at that time in signal DR will not accurately be read by the receiver chip 102. It is preferable for the transitions in signal DR to occur outside the setup/hold time period of receiver clock CKR.

Signal delay between integrated circuit chips ("chips") may be caused by a variety of factors, such as propagation delay between the chips 101, 102. Chips can often be, e.g., tens of centimeters apart and even located on different boards. Skew between the emitter clock CKE and the receiver clock CKR, and jitter and noise at the chip and board levels of the system are other potential components of signal delay, which may be variable due to, e.g., temperature and voltage fluctuations. Moreover, the total delay may be somewhat unpredictable due to random and varying components.

Synchronization

Figure 3:
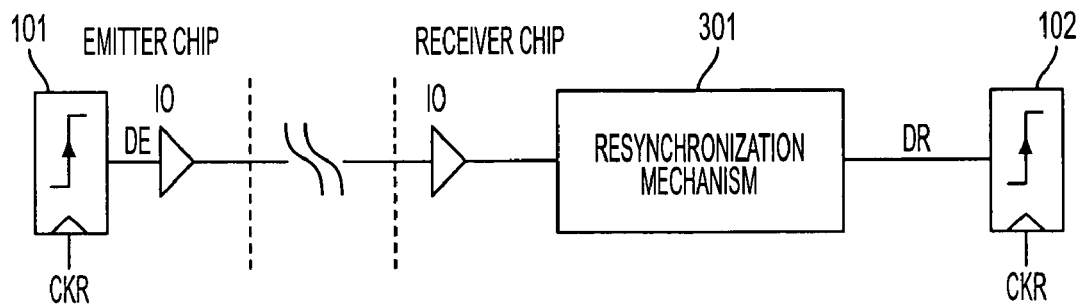
FIG. 3 is a functional block diagram of an illustrative embodiment of a pair of intercommunicating integrated circuit chips, including a resynchronization mechanism.
Figure 4:
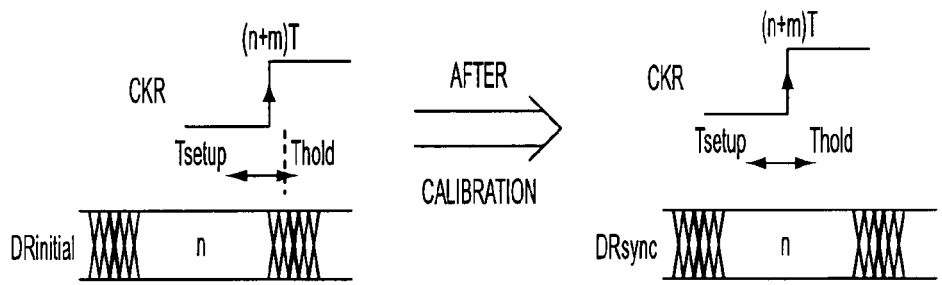
FIG. 4 is a pair of illustrative waveforms showing how the resynchronization mechanism of FIG. 3 may correct synchronization.

Referring to FIG. 3, a resynchronization mechanism 301 is shown inserted into the path that receives signal DR. The resynchronization mechanism 301 helps to avoid the situation of FIG. 2, by avoiding, or at least reducing, the possibility that signal DR transitions occur during the setup/hold time of the receiver chip 102. For example, the resynchronization mechanism 301 may delay signal DR by an appropriate amount to align signal DR better with clock CKR, as shown in FIG. 4. In the present embodiment, the resynchronization mechanism 301 is part of the receiver chip 102, coupled between the input/output port of the receiver chip 102 and the receiving flip-flop of the receiver chip 102. However, the resynchronization mechanism 301 may be located elsewhere.

Figure 5:
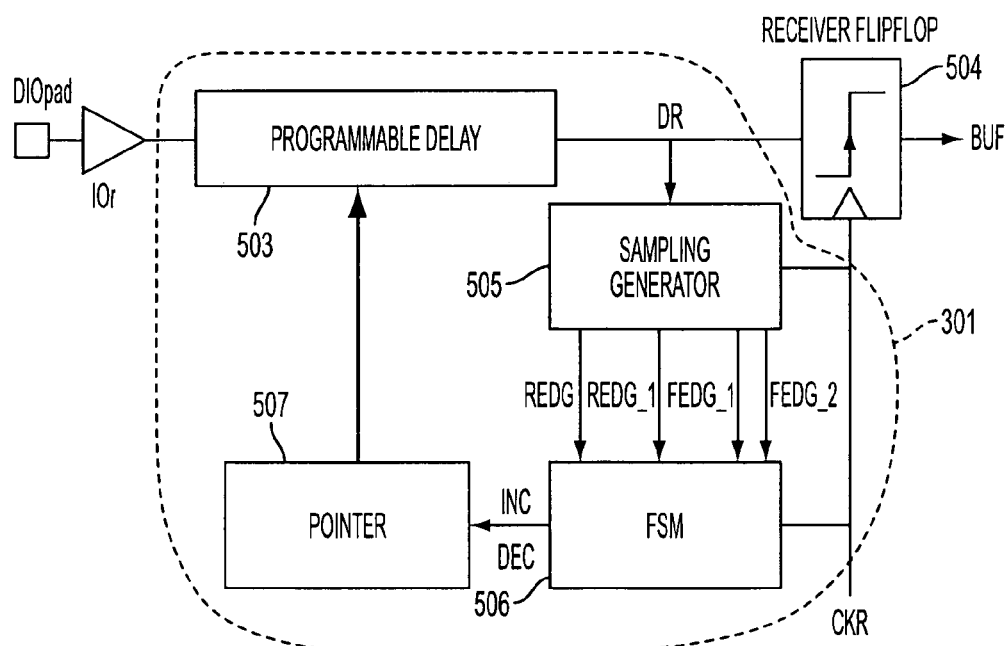
FIG. 5 is a functional block diagram of an illustrative embodiment of the resynchronization mechanism of FIG. 3.

FIG. 5 shows illustrative details of the resynchronization mechanism 301. The resynchronization mechanism 301 in this embodiment is coupled between an input buffer 502 (which receives signal DR via a digital input/output pad 501) and a receiver flip-flop 504 (or, alternatively, a receiver latch). The resynchronization mechanism 301 as shown includes a programmable delay 503, a sampling generator 505, a finite state machine 506, and a pointer 507. The programmable delay 503 performs digital phase alignment (DPA) of signal DR by adjusting the positions of the transition edges of the data in signal DR in order to align the data appropriately in accordance with receiver clock CKR. In general, where the flip-flop 504 samples during one type of clock CKR transition edge, the incoming data transitions on signal DR may be aligned with the other type of clock CKR transition edge. For example, where rising edges of CKR are the active transition edges, then the programmable delay 503 may delay signal DR so that the transitions of the incoming data are aligned with the falling edges of receiver clock CKR. Or, where the falling edges of CKR are the active transition edges, then the programmable delay 503 may delay signal DR so that the incoming data transitions are aligned with the inactive transition edges of receiver clock CKR.

The sampling generator 505, the finite state machine 506, and the pointer 507 form a feedback loop that samples the incoming data and dynamically programs the programmable delay 503 to implement such alignment. The sampling generator receives signal DR after it is delayed by the programmable delay 503, and captures four samples. Two of the samples are captured on the rising edge of CKR, and the other two samples are captured on the falling edge of CKR. In the present embodiment, it will be assumed that CKR rising edges are the active transition edges. In this case, the following samples that will be captured by the sampling generator 505 are shown in Table 1.

TABLE 1

| SAMPLE | DESCRIPTION |
| --- | --- |
| REDG | value of DR on the active transition (e.g., rising) edge of CKR at the current CKR cycle |
| REDG_1 | value of DR on the active transition (e.g., rising) edge of CKR at the previous CKR cycle |
| FEDG_1 | value of DR on the inactive transition (e.g., falling) edge of CKR at the previous CKR cycle |
| FEDG_2 | value of FEDG_1 at the previous CKR cycle |

The finite state machine 506 receives all four samples from the sampling generator 505 and, based on the samples, makes a decision whether to increase, decrease, or leave unchanged the amount of delay generated by the programmable delay 503. In order to calibrate DR, increases and decreases may occur in steps that are less than T, such as T/8, T/16, T/32, T/64, or any other steps.

Figure 6:
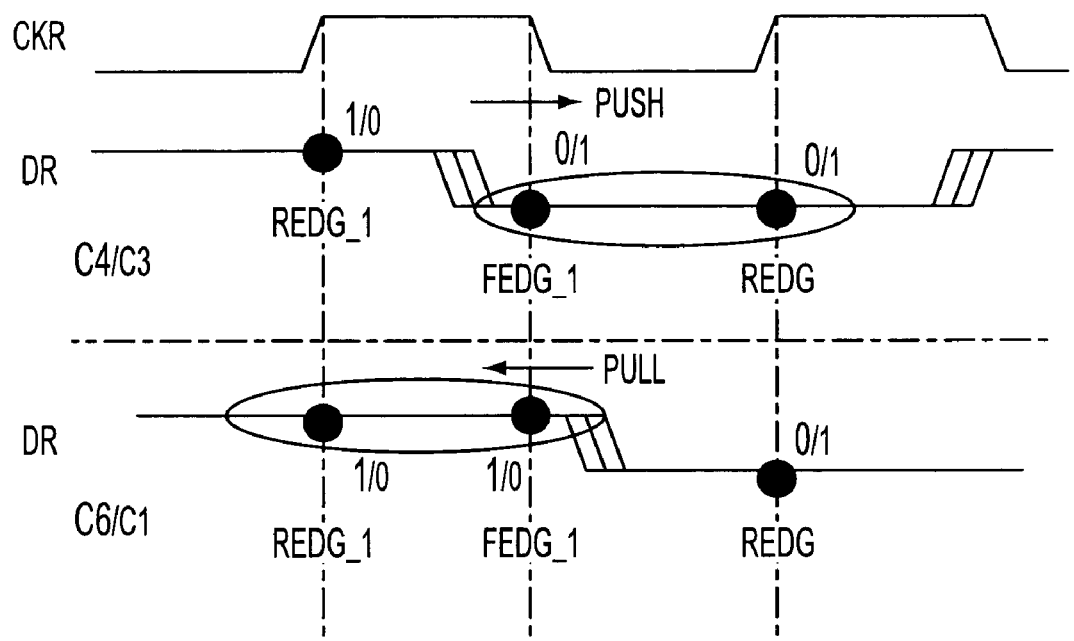
FIGS. 6-8 are illustrative waveforms showing various cases of resynchronization.

To understand how the finite state machine 506 may make a decision, reference is made to Table 2. First, we will study how a decision may be made based only on three of the samples, REDG, REDG_1, and FEDG_1. Depending upon the values of these samples, the finite state machine 506 can determine whether the alignment of signal DR falls into one of the eight cases C0-C7 as shown in Table 2. In cases C3 and C4, the transition edges of signal DR arrive early compared with the closest falling edges of CKR. It would therefore be desirable to push the transition edges of DR to align them with the falling edges of CKR. In cases C1 and C6, the transition edges of signal DR arrive late compared with the closest falling edges of CKR. It would therefore be desirable in these cases to pull the transition edges of DR to align them with the falling edges of CKR. Cases C1, C3, C4, and C6 are illustrated in FIG. 6, where the rising edges of CKR are the active transition edges. In the remaining figures and description, unless otherwise stated, it will be assumed for illustrative purposes that the rising edges of CKR are the active transition edges.

TABLE 2

| CASE | REDG_1 | FEDG_1 | REDG | ANALYSIS |
| --- | --- | --- | --- | --- |
| C0 | 0 | 0 | 0 | No Transition |
| C1 | 0 | 0 | 1 | Late |
| C2 | 0 | 1 | 0 | Jitter |
| C3 | 0 | 1 | 1 | Early |
| C4 | 1 | 0 | 0 | Early |

TABLE 2-continued

| CASE | REDG_1 | FEDG_1 | REDG | ANALYSIS |
| --- | --- | --- | --- | --- |
| C5 | 1 | 0 | 1 | Jitter |
| C6 | 1 | 1 | 0 | Late |
| C7 | 1 | 1 | 1 | No Transition/Jitter |

Figure 7:
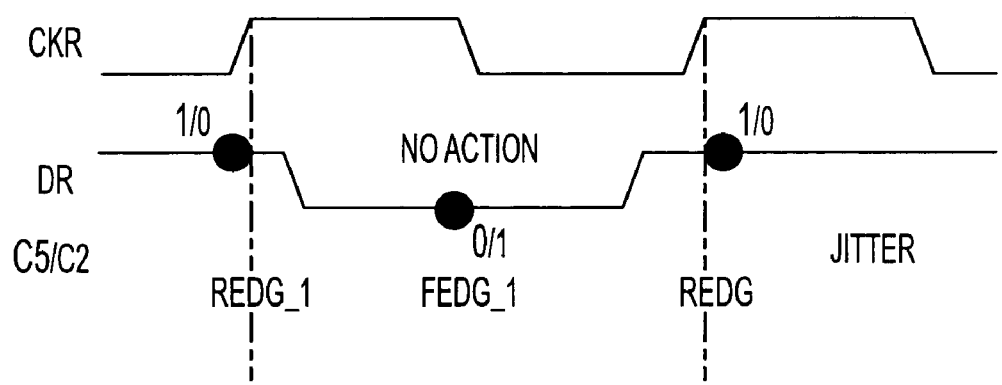

In cases C5 and C2, the two consecutive samples REDG and REDG_1 have the same value even if the intermediate sample FEDG_1 has an opposite value. These cases may occur due to jitter and noise on the emitter clock CKE and/or receiver clock CKR, and possibly due to jitter introduced on the data path. In cases C5 and C2, signal DR transition edges are already roughly aligned with the rising edges of CKR, and so no action is desired. In other words, the current delay of the programmable delay 503 is correct. Cases C5 and C2 are illustrated in FIG. 7.

Figure 8:
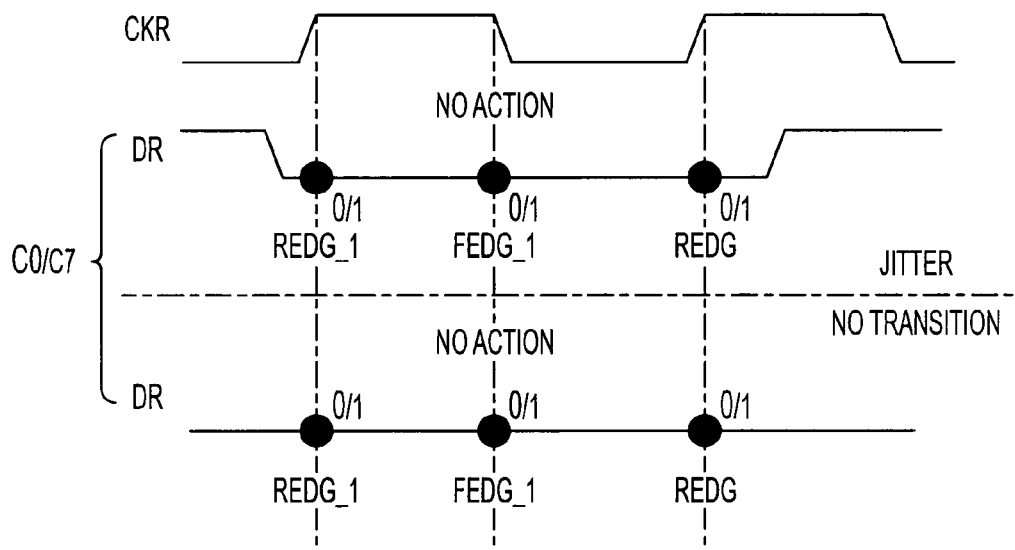

In cases C0 and C7, three consecutive samples have the same value, and so there is no transition to measure the skew of DR relative to CKR. These cases would occur either where there is no transition in DR, or where there is sufficient jitter in DR. Cases C0 and C7 are illustrated in FIG. 8.

Figure 9:
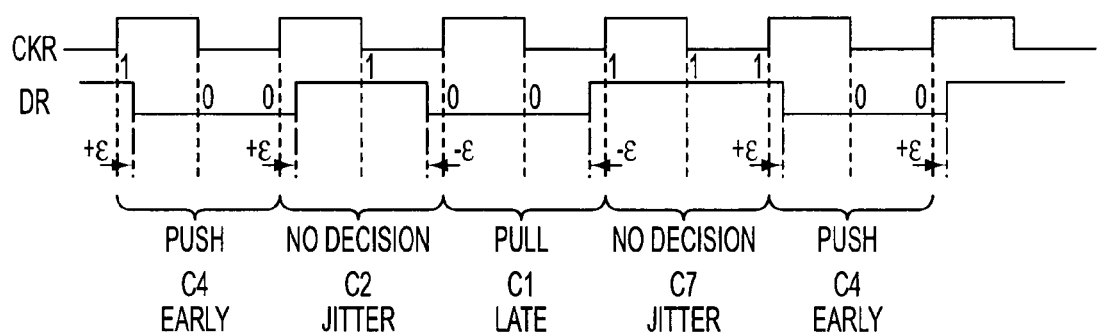
FIGS. 9 and 10 are illustrative waveforms showing how transition edges of DR may lock in on the active transition edges of CKR.
Figure 10:
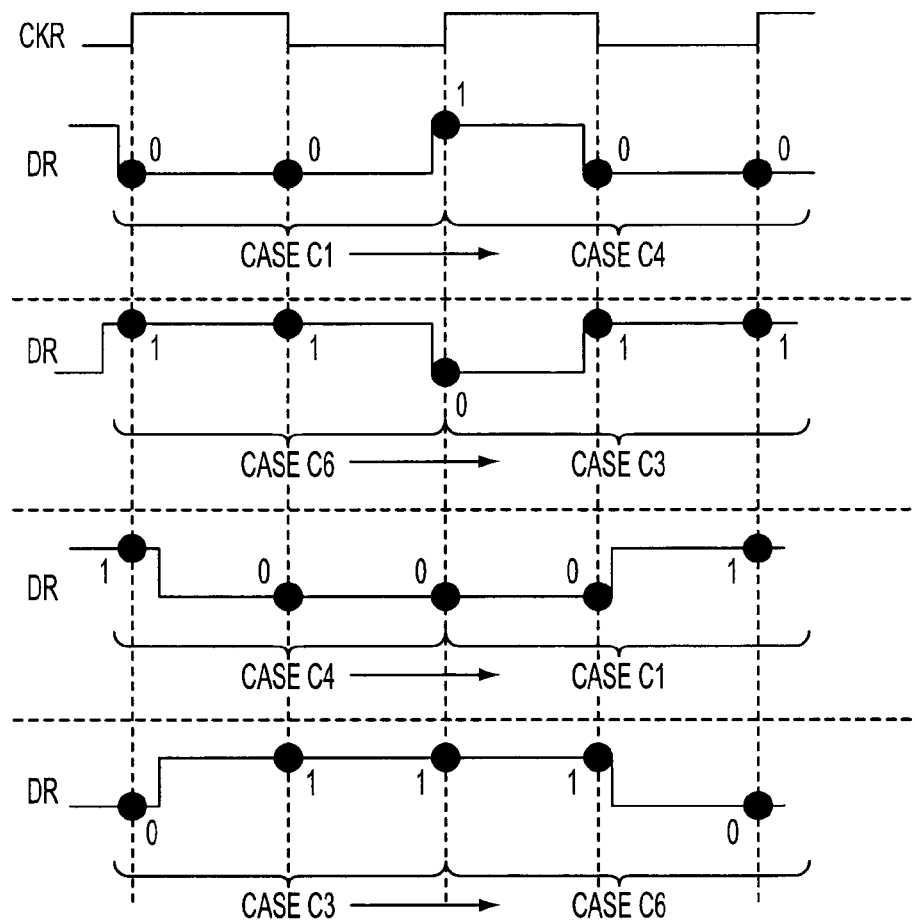

However, any of the above cases may be determined where the transition edges of DR occur around the active edge of CKR. Thus, the above algorithm, based only on the early/late decision, may not always work optimally. As illustrated by FIGS. 9 and 10, this is because transition edges of DR that are close to the active edges of CKR may induce a "lock" on the active edges of CKR, and/or may unnecessarily increase the time required for calibration. This is undesirable, as it is preferable to keep the transition edges of DR away from the active edges of CKR. Such a lock may be induced because DR may oscillate between being late and early, and thereby oscillate between certain of the above-mentioned cases. For instance, DR may oscillate between cases C1 and C4, or between cases C3 and C6.

Thus, an algorithm that also uses FEDG_2 may provide additional information that results in a more effective synchronizer. The truth table of such an algorithm may be as shown in Table 3. In addition, such an algorithm may preferably be biased toward either decreasing or increasing the delay through the programmable delay 503 in order to avoid the jitter area close to the active transition edges of CKR, and to avoid locking in on the active transition edges. Preferably, as illustrated by Table 4, such a bias should be toward decreasing the delay through the programmable delay 503, so that the average propagation delay can be minimized. As shown in the example of Table 4, where jitter is detected, the decision would always be to decrease the delay through the programmable delay 503, regardless of the previous decision.

TABLE 3

| ANALYSIS | REDG_1 | FEDG_1 | REDG | FEDG_2 |
| --- | --- | --- | --- | --- |
| No Data | 0 | 0 | 0 | 0 |
|  | 1 | 1 | 1 | 1 |
| Jitter | 0 | 0 | 0 | 1 |
|  | 1 | 1 | 1 | 0 |
|  | 0 | 1 | 0 | X |
|  | 1 | 0 | 1 | X |
| Early | 0 | 1 | 1 | X |
|  | 1 | 0 | 0 | X |
| Late | 0 | 0 | 1 | X |
|  | 1 | 1 | 0 | X |

TABLE 4

| CURRENT CYCLE | PREVIOUS CYCLE | NEW DECISION |
|---|---|---|
| Jitter | X | Decrease Delay |
| No Data | X | No Action |
| Early | Early | Increase Delay |
|  | Late | Increase Delay |
|  | Jitter | No Action |
|  | No Data | Increase Delay |
| Late | X | Decrease Delay |

Figure 11:
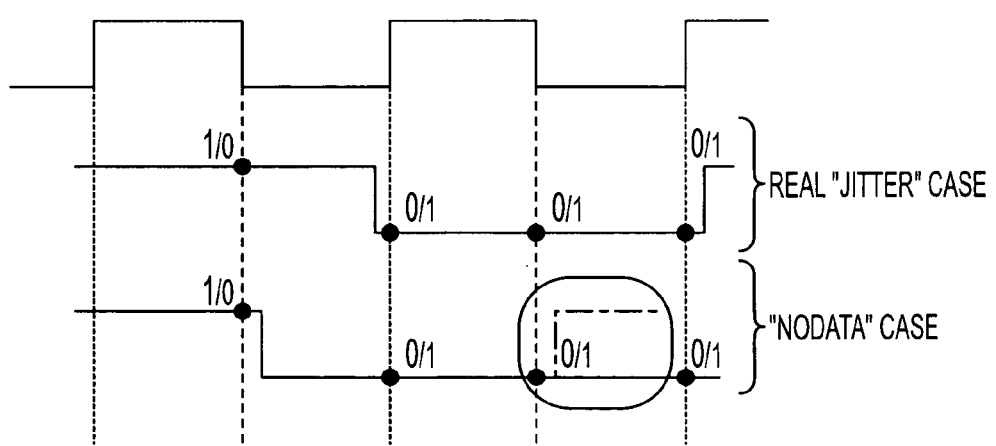
FIG. 11 is an illustrative waveform comparing a real jitter case with a no-data case.

However, using the truth table shown in Table 3, it is still not always possible to differentiate between the Jitter and No Data cases where DR is sampled as {0001} or {1110}. For example, as shown in FIG. 11, the top waveform represents a real Jitter case, whereas the bottom waveform shows DR to be perfectly aligned with the falling edges of CKR. However, based on the four samples taken, both appear the same to the finite state machine 506. During calibration, the algorithm implemented by the finite state machine 506 may continue to work well, since the action decided in the Jitter case would be to decrease the value of the propagation delay, as is also done in the Late case.

Figure 12:
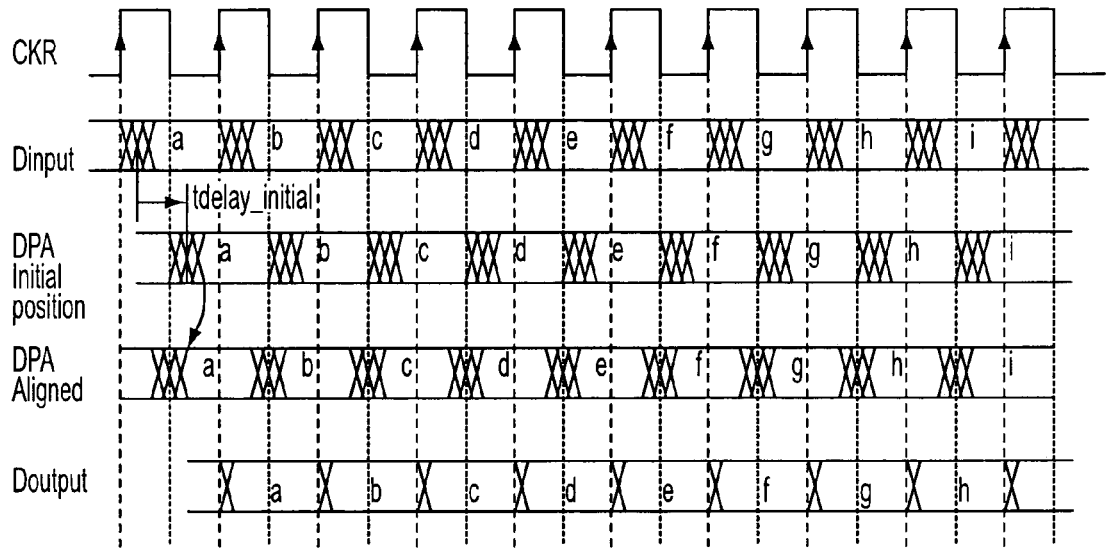
FIGS. 12 and 13 are illustrative waveforms showing how the resynchronization mechanism may, in some cases, introduce latency in the incoming data, while in other cases no latency may be introduced.
Figure 13:
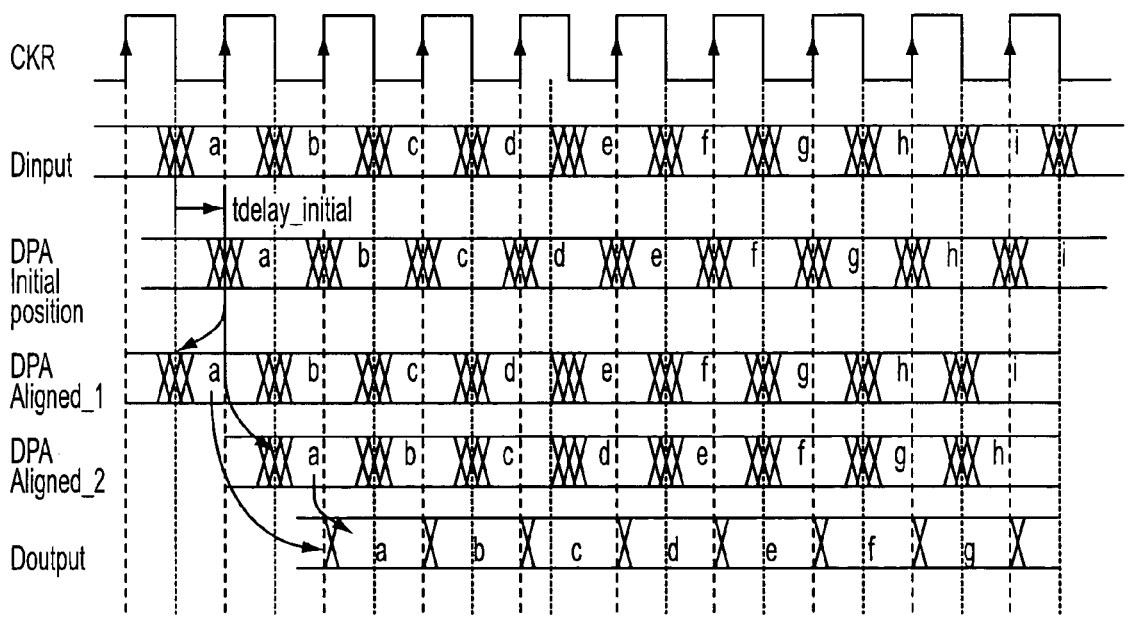

FIGS. 12 and 13 show two illustrative cases of how DR may be initially aligned with CKR just after reset or power-up. In FIG. 12, DR is received such that transition edges of DR are close to the falling/inactive transition edges of CKR. As shown, the programmable delay 503 may have an initial delay, which may be adjusted based on the samples produced by the sampling generator 505, resulting in an aligned DR. In FIG. 13, DR is received this time such that the transition edges of DR are close to the rising/active transition edges of CKR. Depending upon the initial position of DR (just after reset or power-up), and depending upon the default propagation time of the programmable delay 503, the programmable delay 503 may initially center DR on either cycle i (DPA Aligned_1) or cycle i+1 (DPA Aligned_2).

Smoothing

Even after the transition edges of DR are calibrated to align with the inactive transition edges (in this example, the falling edges) of CKR, the precision of the calibration may be reduced if a wrong decision is made by the finite state machine 506. Wrong decision may be due to jitter, for instance. In other words, instead of performing an increase, then a decrease, then an increase, oscillating around the falling edge of CKR, a wrong decision may be made to perform, for example, two consecutive increases due to jitter. Such a wrong decision may amplify the effects of the jitter. To reduce the effects and probability of making a wrong decision, it may be desirable to smooth the decision process and make it more stable. This would involve maintaining a history of previous decisions, and using those previous decisions to help make the current decision. For example, the last one, two, three, or more decisions may be used in making the current decision. Also, some decisions may be intermediate decisions that are not necessarily implemented, and final decisions that are actually implemented would be based on the prior intermediate decisions.

Figure 14:
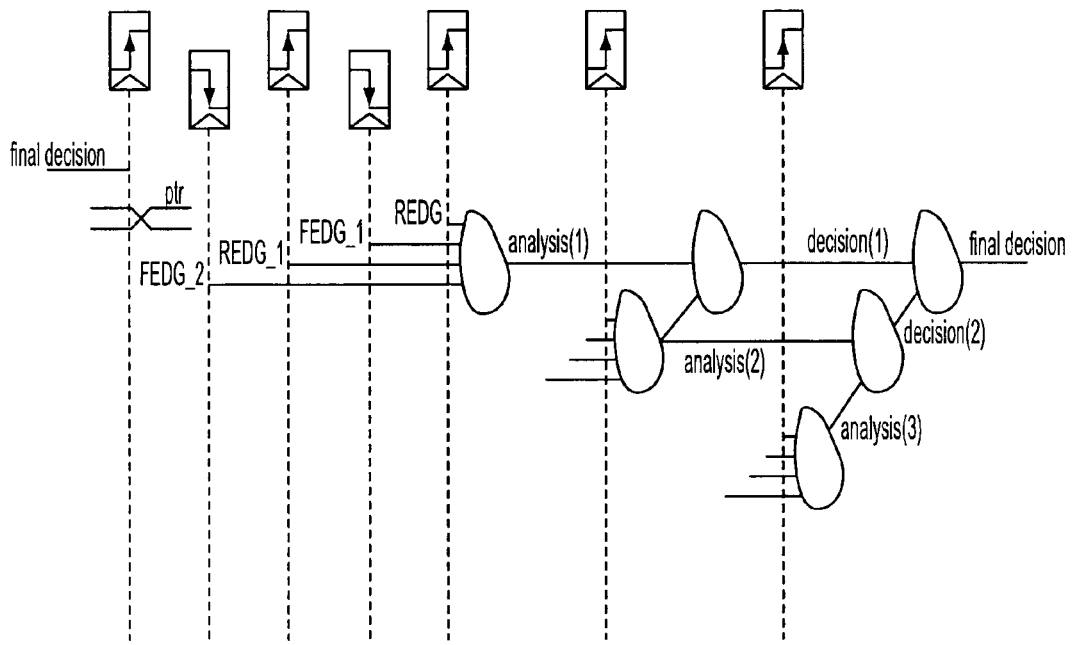
FIG. 14 is a diagram showing an illustrative set of smoothed decisions that may be made.

Tables 5 and 6, in conjunction with FIG. 14, illustrate how decisions may be made. In the present illustrative embodiment, during a given cycle n+2 of CKR, a first analysis "analysis(1)" is performed based on samples FEDG_2, REDG_1, FEDG_1, REDG measured from previous cycles n and n+1, in accordance with Table 3. A second analysis "analysis(2)" is performed during cycle n+3 based on samples FEDG_2, REDG_1, FEDG_1, REDG measured from previous cycles n+1 and n+2 (in other words, the same samples but taken one cycle later), in accordance with Table 3. A first intermediate decision "decision(1)" is then made based upon analysis(1) and analysis(2), in accordance with Table 4. In Table 4, "Current Cycle" would correspond to analysis(2) and "Previous Cycle" would correspond to analysis(1).

TABLE 5

| CYCLE | INTERMEDIATE DECISION | ACTION |
|---|---|---|
| n | X | X |
| n + 1 | X | X |
| n + 2 | X | X |
| n + 3 | decision(1) | X |
| n + 4 | decision(2) | final decision (See Table 6) |

The analysis/intermediate decision process is then repeated, such that a third analysis "analysis(3)" is performed during cycle n+4 based on samples FEDG_2, REDG_1, FEDG_1, REDG measured from previous cycles n+2 and n+3, in accordance with Table 3. A second intermediate decision "decision(2)" is then made based upon analysis(1) and analysis(2), in accordance with Table 4. In this case, in Table 4, "Current Cycle" would correspond to analysis(3) and "Previous Cycle" would correspond to analysis(2).

Thus, two intermediate decisions have been made, whether to increase the delay, decrease the delay, or maintain the existing delay. A final decision (one that is actually implemented and affects the delay) is then made based on the results of the intermediate decisions decision(1) and decision(2), in accordance with Table 6. For example, where both decision(1) and decision(2) are increase the delay, then the final decision that is actually implemented would be to increase the delay. On the other hand, where decision(1) is to increase the delay and decision(2) is to decrease the delay, then the final decision would be to maintain the existing delay (i.e., take no action). In general, if intermediate decisions decision(1) and decision(2) match, then the final decision equals decision(1) and decision(2). Where decision (1) and decision(2) conflict such that one decision is to increase the delay and the other is to decrease the delay, then the final decision according to Table 6 is to maintain the delay (i.e., take no action). Where one of the intermediate decisions is to take to action, then the final decision equals the other intermediate decision. Once the final decision is implemented, the entire process of analysis, intermediate decisions, and a resulting final decision, may repeat. In this way, two consecutive intermediate decisions are used to smooth the final decision and reduce the possibility of oscillating alternate decisions caused by jitter.

TABLE 6

| DECISION (1) | DECISION (2) | FINAL DECISION |
|---|---|---|
| Increase | Increase | Increase |
| Increase | Decrease | No Action |
| Increase | No Action | Increase |
| Decrease | Increase | No Action |
| Decrease | Decrease | Decrease |
| Decrease | No Action | Decrease |
| No Action | Increase | Increase |
| No Action | Decrease | Decrease |
| No Action | No Action | No Action |

Latency Adjustment

While synchronizing DR, it may be desirable to ensure that the latency between the emitter chip 101 and the receiver chip 102 remains constant. It is often useful to be able to rely upon a total number clock periods that occur for a given point-to-point connection. There are external factors that can affect latency in unpredictable ways, such as propagation time variations due to temperature, voltage, etc. that may occur in the data path between the emitter chip 101 and the receiver chip 102. Accordingly, for a given point-to-point connection between chips, depending upon the conditions that exist during the calibration phase, the total latency introduced after calibration may be either mT or (m+1)T. It may further be desirable to ensure that one or more point-to-point connections have a particular latency, e.g., (m+1)T. However, although the receiver chip 102 may be able to calibrate the timing of DR by incremental fractions of period T, the receiver chip 102 will not be able to locally distinguish between these two latencies merely by sampling DR as previously described. Thus, the receiver chip 102 will not be able to determine whether, in additional to fractional T calibration, a delay of an entire period T should also be added to the signal path by the programmable delay 503. This problem is illustrated by FIG. 15.

Figure 15:
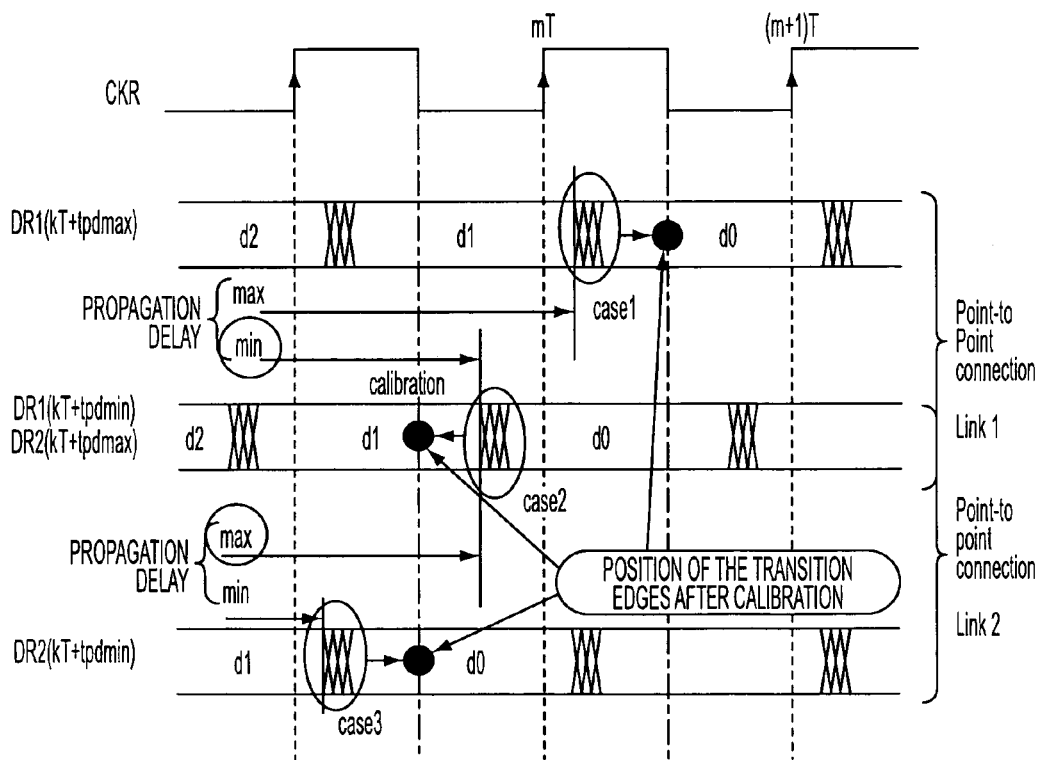
FIG. 15 is a set of waveforms illustrating the latency problem.

FIG. 15 shows the possible latencies of two different illustrative point-to-point links are shown. DR1 is received over a first link, and DR2 is received over a second link. Over the first link, DR1 may have a latency that varies anywhere between case 1 (maximum arrival time of data) and case 2 (minimum arrival time of data). In these cases, based on the previously-described algorithm, the circled data in DR1 will be captured on cycle (m+1)T for case 1, and on cycle mT for case 2, where the active edge transition is the rising edge of CKR To keep the latency consistent between the two cases, a whole cycle T of delay would properly be added to case 2 (in addition to any sub-period calibration delay) but not to case 1. Over the second link, DR2 may have a latency that varies anywhere between case 2 (this time, the minimum arrival time of data) and case 3 (maximum arrival time of data). In both of these cases, based on the previously-described algorithm, the circled data in DR2 will be captured on cycle mT, and so one cycle T of delay would be added to both case 2 and case 3 for the second link.

However, there is no way to locally differentiate case 1 (where no added cycle is needed) from case 3 (where one cycle is added). Thus, without additional external information, the receiver chip 102 would have no way of determining whether to add a cycle of delay or not to obtain the desired latency. For this reason, latency adjustment preferably uses information from a source external to the receiver chip 102. This information may include the expected worst-case latency for the link, along with a simultaneous starter signal sent to both the emitter chip 101 and the receiver chip 102, and a specific latency adjustment pattern sent in response to the starter signal.

In particular, the receiver chip 102 may be provided by an external source with the expected worst-case latency value for the link of interest (in this example, the link from the emitter chip 101 to the receiver chip 102). Next, the emitter chip 101 and the receiver chip 102 wait for a starter signal. In response to the starter signal, the emitter chip 101 sends a predetermined latency adjustment pattern of bits to the emitter chip 102. At the same time, the receiver chip 102 starts a latency counter. When the receiver chip 102 receives the latency adjustment pattern from the emitter chip 101, the receiver chip 102 can derive the latency of the link by referencing the value of the latency counter.

Figure 16:
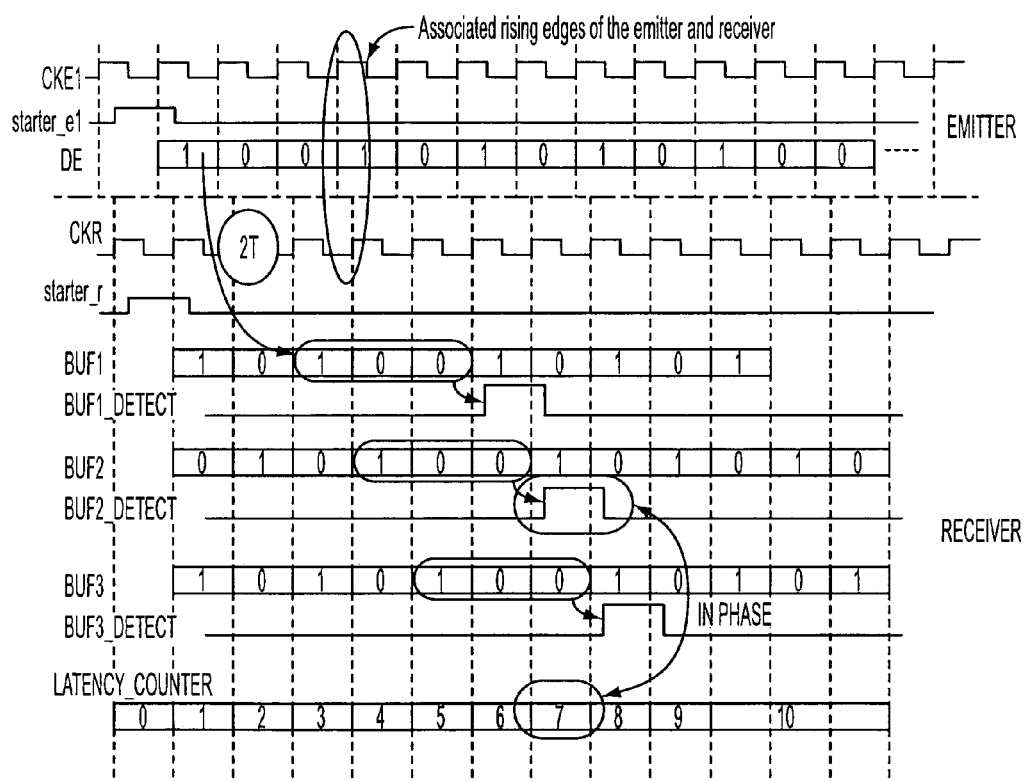

FIG. 16 illustrates an example where the expected worst-case latency of a link is 3T, but the actual determined latency turns out to be 2T. In FIG. 16, in response to starter signal starter_e1, pattern DE (which is a latency adjustment pattern followed by a synchronization pattern in this embodiment) is sent by the emitter chip 101. In this example, the latency adjustment pattern is {100}. However, the latency adjustment pattern may be any pattern and of any length as long as it is known by both the emitter chip 101 and the receiver chip 102 in the link. The receiver chip 102 may have a plurality of delay units in series, such as first-in-first-out (FIFO) buffers BUF1, BUF2, BUF3, that together form an elastic FIFO buffer. In this example, three buffers are used. However, less or more buffers may be used in a similar manner. The more latency that is expected, the more buffers may be needed.

Each delay unit receives the output of the delay unit in front of it. In this example, each buffer generates a delay of one cycle T. In response to the latency adjustment pattern, each buffer may generate a buffer detect signal BUF1_DETECT, BUF2_DETECT, BUF3_DETECT. Whichever buffer detect signal is in phase with a known count in the latency counter, that is the buffer that will be used to calibrate the latency of that link. The known count in the latency counter is related to the expected worst-case latency, which in this example is 3T. In this example, the known count is related to the expected worst-case latency iT such that the known count=i+4. In this example, since i=3, the known count=7. The buffer detect signal that occurs when the latency counter equals 7 is BUF2_DETECT. Therefore, the BUF2 buffer, with a 2T delay, will be used at the output of the resynchronization mechanism 301. Other relationships between the expected worst-case latency and the known count may be used, and the relationship may depend upon one or more factors such as the length of the predetermined latency adjustment pattern. For example, if the latency adjustment pattern were longer, such as {1001}, then the known count might be i+5. In general, the longer the adjustment pattern, the more cycles of latency that may be compensated for. On the other hand, the longer the adjustment pattern, the longer and more elastic the buffer resources need to be. There is therefore a compromise to be made between the maximum number of cycles of latency that can be compensated for and the size of the elastic buffer.

Figure 17:
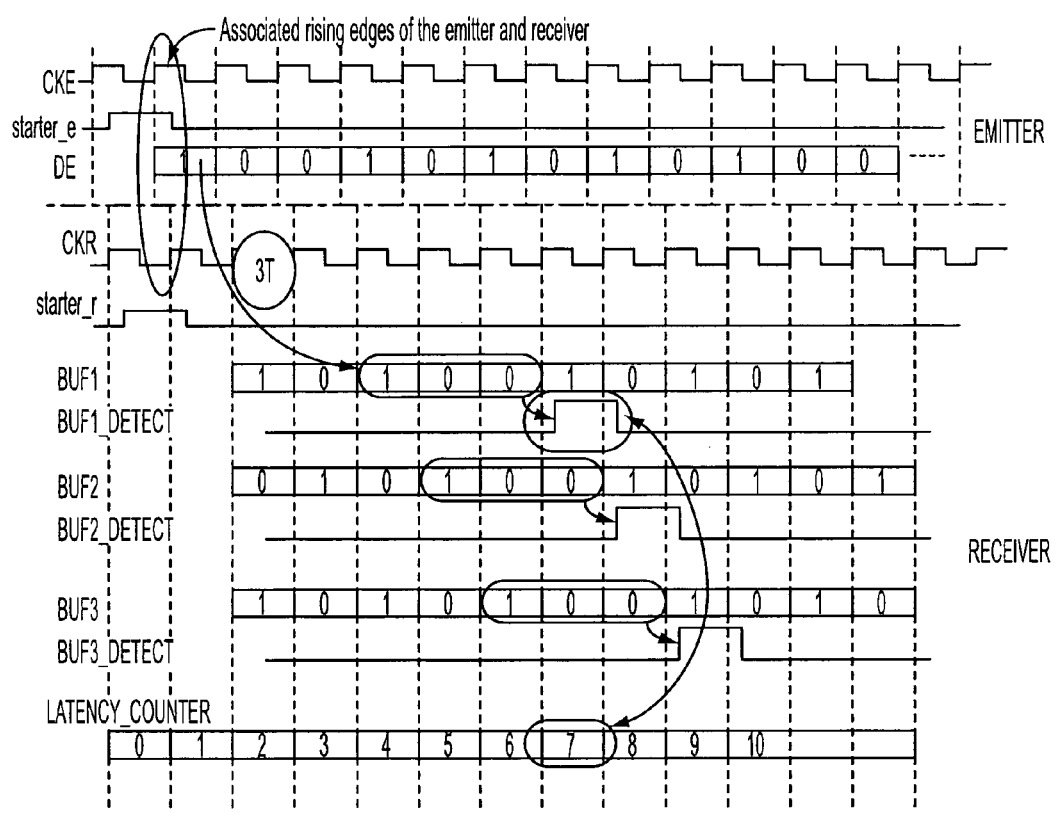

FIG. 17 illustrates the same embodiment as FIG. 16, except that the measured actual latency on the link this time is 3T, which happens to be equal to the expected worst-case latency. In this example, the BUF1 buffer is used, with a 3T delay. This is because the BUF1_DETECT buffer detect signal occurs when the latency counter equals i+4=7.

Figure 18:
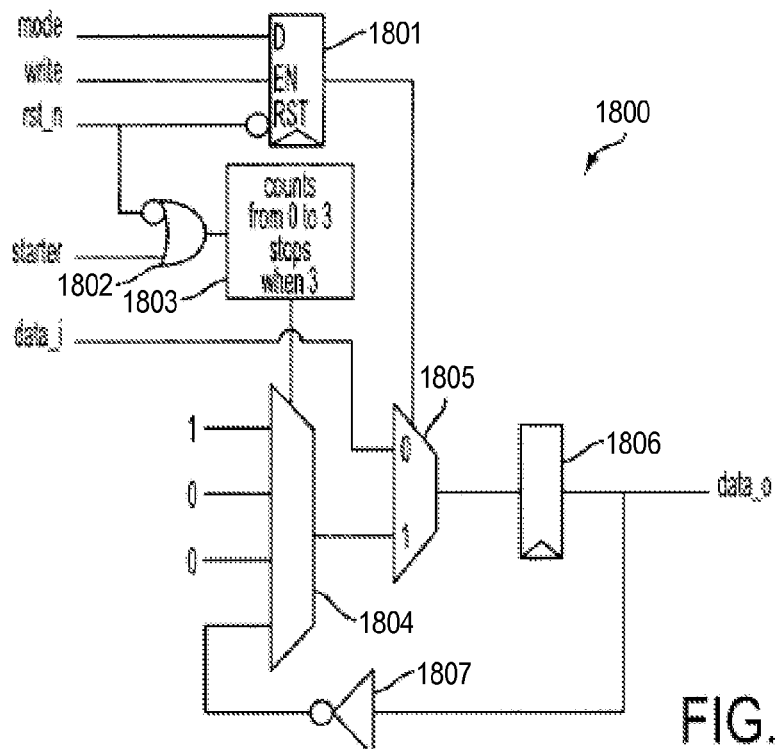
FIG. 18 is a circuit schematic diagram of an illustrative emitter circuit that may be included in the emitter chip of FIG. 3.

To simplify the latency adjustment process, it is preferable that the starter signal arrive at the emitter chip 101 and the receiver chip 102 simultaneously. However, for various reasons, it may be difficult to ensure this. It is therefore possible that the starter signal arrives at the emitter chip 101, for example, one period T earlier or later than it arrives at the receiver chip 102. Such a skew can nevertheless be accounted for in the latency adjustment process. As an example, FIG. 18 shows a situation where there is a 2T calibration latency, in addition to a 1T late receiver starter signal latency. In this example, a fourth pipeline buffer BUF4 is used, and the expected worst-case latency is 4T.

Emitter Circuit

FIG. 18 shows and example of a pattern generation circuit 1800 in the emitter chip 101 for generating the latency adjustment pattern and a synchronizing pattern. The pattern generation circuit 1800 as shown includes a control register 1801 (such as a D latch in this example) that receives a mode signal, a write enable signal, and a reset signal rst_n. Depending upon the state of the control register 1801, the pattern generation circuit 1800 either outputs data_i generated by the emitter chip 101 or outputs any pattern currently being generated. The pattern generation circuit 1800 also includes an OR gate 1802 that receives an inverted rst_n and the starter signal. A counter 1803 begins counting in response to the output of the OR gate 1802. The counter 1803 may count up to one plus the desired length in bits of the latency adjustment pattern (in this example, 1+3=4). Thus, in this example, the counter 1803 counts from zero to three, and outputs a pair of bits in the order {00}, {01}, {10}, and then {11}.

A multiplexor 1804 receives the outputs of the counter 1803 as control inputs, and thus as the counter 1803 counts, the multiplexor 1804 rolls through its various inputs. All but one of the inputs to the multiplexor 1804 in this example are set to respective bits of the latency adjustment pattern itself. Thus, three of the inputs to the multiplexor 1803 in this example are {1, 0, 0}. The fourth input to the multiplexor 1804 receives inverted feedback from the output of the multiplexor 1804 via an inverter 1807. A second multiplexor 1805 passes either data_i or the output of the multiplexor 1804, depending upon the state of the control register 1801. Finally, a second latch 1806 holds the output of the multiplexor 1805, and outputs it as data o, until the next cycle of CKE. Table 7 shows how the various inputs to the pattern generation circuit 1800 affect its operation.

TABLE 7

| | | |
|---|---|---|
| mode | 0 | Functional mode: programs the pattern generation circuit to send the standard data data_i |
| | 1 | Synchronization mode; programs the pattern generation circuit to send the latency adjustment pattern {100} and the synchronization pattern {101010 . . . } |
| write | 1 | Writes the mode into the control register (active high) |
| rst_n | 0 | Synchronous reset (active low) |
| starter | pulse | Starts the emission of the latency adjustment pattern followed by the synchronization pattern |
| data_i | — | Functional data |
| data_o | — | Output data. May be the latency adjustment pattern, the synchronization pattern, or functional data |

Receiver Circuit

Figure 19:
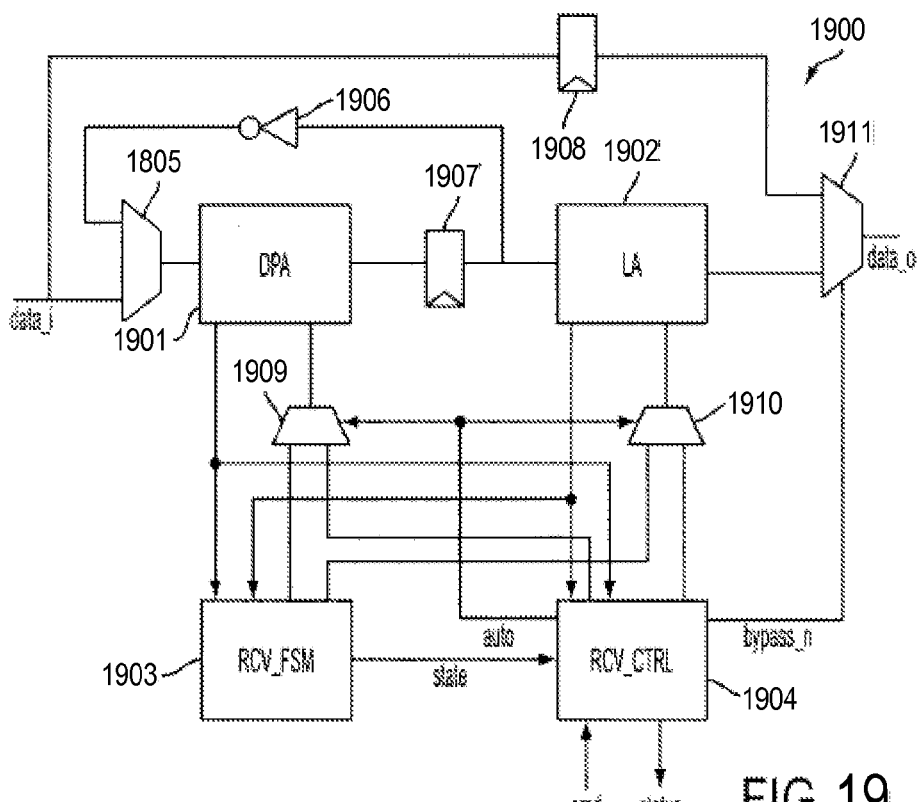
FIG. 19 is a circuit schematic diagram of an illustrative receiver circuit that may be included in the receiver chip of FIG. 3.

The synchronizing, latency adjustment, and temporizing functions may be performed in a receiver circuit located in the receiver chip 102. Referring to FIG. 19, an illustrative receiver circuit 1900 may include a digital phase alignment (DPA) unit 1901, which aligns edge transitions of input data data_i with the inactive transition edge of receiver clock CKR. The receiver circuit 1900 may further include a latency adjustment (LA) unit 1902, which accounts for any latency that may exist on the link between the source of data_i and the receiver circuit 1900. The receiver circuit 1900 may further include a receiver finite state machine (RCV_FSM) unit 1903 and/or a receiver control (RCV_C-TRL) unit 1904, which control the overall operations of the receiver circuit 1900. The receiver circuit 1900 may further include various support circuitry 1905-1911.

Together, these units provide for automatic synchronization and latency adjustment of the incoming data data_i. However, using the path through register 1908, and by setting multiplexor 1911 appropriately in accordance with signal bypass_n, the entire synchronization/latency system may be bypassed. It may be desired that this bypass mode be a power-on or reset default. Also, some or all of the functionality of the receiver circuit 1900 may be controlled automatically or manually, and debug and other special applications may further be supported. The following will discuss detailed illustrative embodiments of the various units 1901-1904 included in the receiver circuit 1900.

Figure 20:
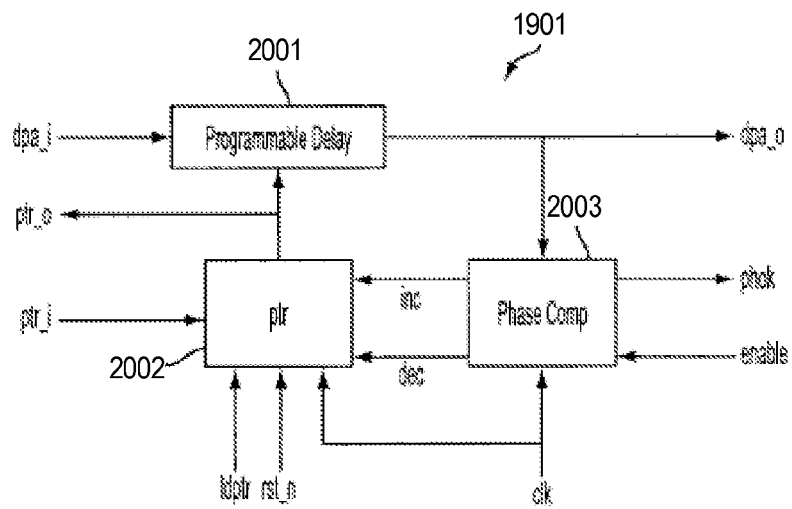
FIG. 20 is a functional block diagram of the digital phase alignment unit of FIG. 19.

The digital phase adjustment unit 1901, as shown illustratively in FIG. 20, may include a programmable delay 2001, a counter 2002, and a phase comparator 2003. Upon power-up or reset, the programmable delay 2001 may be set to an initial amount of delay, such as 0.25T, 0.5T, or 0.75T. The initial amount of delay may preferably be set at an intermediate value so that the digital phase adjustment unit 1901 is able to both "push" and "pull" (i.e., increase delay and decrease delay) of the input data data_i as appropriate. The programmable delay 2001 may have a range of delay amounts that it is capable of generating. This range may be any range, such as 0 through T, 0 through 1.5T, or even more. Thus, for example, assuming the range of the programmable delay 2001 is 0 through 1.5T, and that the bit rate of data_i is 190 MHz, the programmable delay 2001 would have a delay range of about zero to about 7.5 ns. Where the amount of delay is represented by a five bit value, the granularity would be 7.5/32 ns=approximately 234 ps under best-case conditions.

Figure 21:
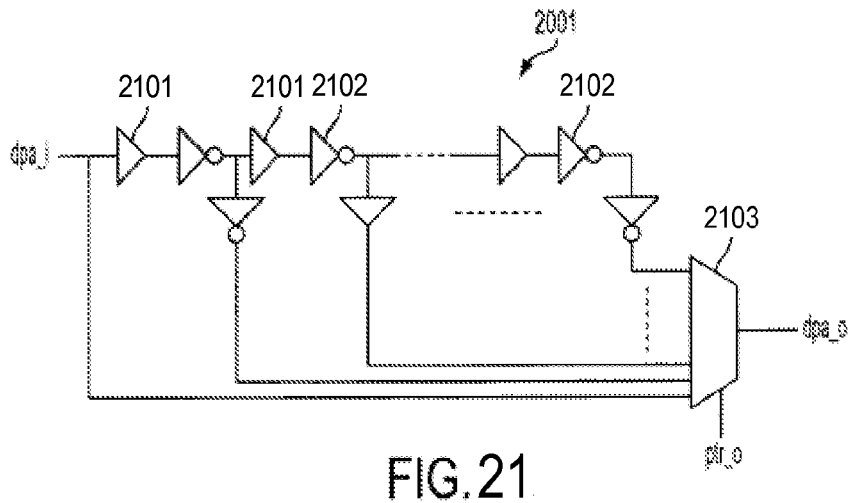
FIG. 21 is an illustrative circuit schematic diagram of the programmable delay of FIG. 20.
Figure 22:
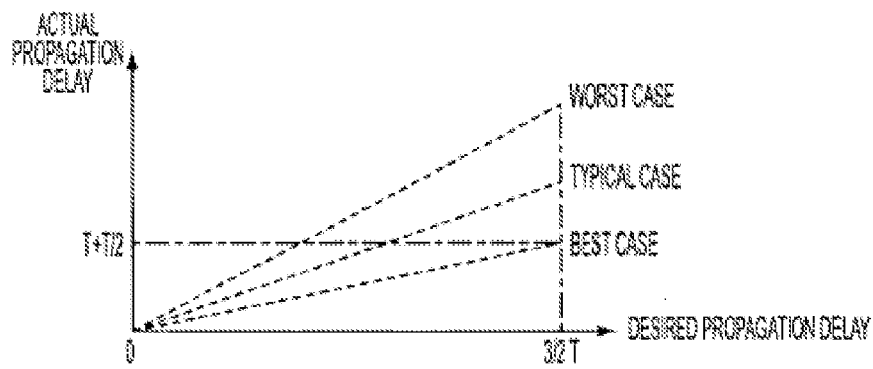
FIG. 22 is a graph showing illustrative variations in propagation delay in the programmable delay of FIG. 20.

Referring to FIG. 21, the programmable delay 2001 may include a set of series-connected delay cells 2101. The desired delayed version of input signal dpa_i is taken from a specified portion along the set of delay cells 2101 and selected by a multiplexor 2103 in accordance with pointer signal ptr_o. In the example of the previous paragraph, there are thirty-two steps of delay, so there may be thirty-two delay cells 2101 and thirty-two inputs to the multiplexor 2103. The multiplexor 2103 selects the appropriate delayed version of dpa_i and outputs is as dpa_o. A complication is that the delay cells 2101 may not be symmetrical; they often apply slightly different propagation times to rising and falling transition edges. This discrepancy may be amplified the longer the chain of delay cells 2101, as illustrated by FIG. 22. Therefore, inverters 2102 may be added between each of the delay cells 2101 to balance the propagation times and provide a more symmetrical output. Although this may provide a symmetrical output, adding the inverters 2102 does not, of course, remove the asymmetrical delay applied to either the rising or falling transition edges. Instead, the inverters 2102 spread the otherwise asymmetrical delay evenly between the two types of transition edges. Indeed, the addition of the inverters 2102 adds still further delay. These factors should thus be taken into account when selecting the amount of delay to be provided by each of the delay cells 2101.

The counter 2002 stores a pointer ptr_o that points to and controls the amount of delay to be implemented by the programmable delay 2001. Pointer ptr_o may be incremented, decremented, or maintained at a constant value, in accordance with commands from the phase comparator 2003. Pointer ptr_o may also be reset in accordance with signal rst_n, and a new value of ptr_o may be loaded from signal ptr_i when signal ldptr is set. When the counter 2002 changes the output of ptr_o, some of the bits of ptr_o may not exactly simultaneously, possibly resulting in a glitch at the control input of the multiplexor 2103 in the programmable delay 2001 (and thus in dpa_o). A Gray counter could be used if desired to avoid such glitches, since in Gray counters only one bit at a time changes. However, such glitches are inconsequential in this embodiment since they would occur just after the rising/active transition edges of clock CKR, and in the current embodiment dpa_o is read only on the falling/inactive transition edges, allowing ptr_o half a period to stabilize. Thus, a Gray counter would not be necessary.

Figure 23:
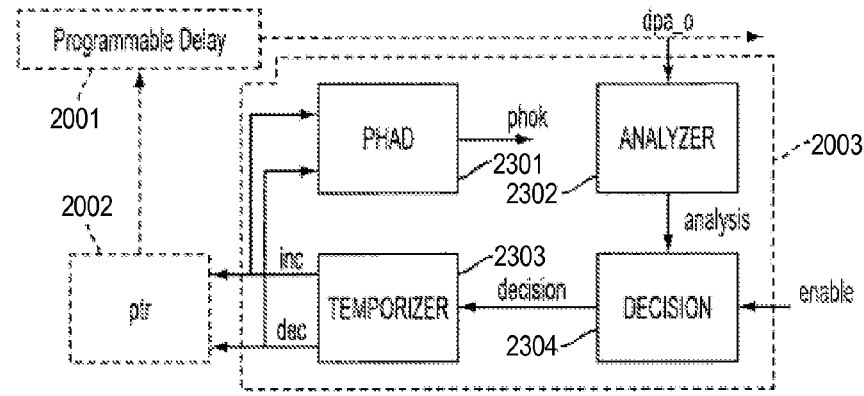
FIG. 23 is an illustrative functional block diagram of the phase comparator of FIG. 20.

Referring to FIG. 23, the phase comparator 2003 may include a phase alignment detection (PHAD) block 2301, which analyzes sequences of commands affecting ptr to decide whether dpa_o is synchronized. The phase comparator 2003 may further include an analyzer 2302 that provides information to a decision block 2304 that enables the decision block 2304 to make intermediate decisions as to whether the pointer ptr stored in the counter 2002 should be incremented, decremented, or maintained at a constant value.

The PHAD block 2301 may further generate a signal phok ("PHase alignment OK") when signal dpa_o is synchronized with the rising/active transition edge of CKR. The PHAD block 2301 may To generate the phok signal, the PHAD block 2301 may use a rolling counter ("phok counter"), such as a two bit counter that counts from zero to four and then rolls around to zero to begin counting again. When the phok counter arrives at a predetermined value, such as three, the phok signal is set. Otherwise, phok is inactive. In other words, phok is set for one out of every four counts of the two bit phok counter in this embodiment.

A temporizer 2303 receives the intermediate decisions from the decision block 2304 and makes a final decision based on the intermediate decisions. The temporizer 2303 acts to smooth the intermediate decisions, and issues INC (increment) and DEC (decrement) commands that increment and decrement ptr, respectively. The temporizer 2303 may also issue explicit NOACTION (no action) commands, or implicit NOACTION commands implied by the lack of an INC or DEC command.

Figure 26:
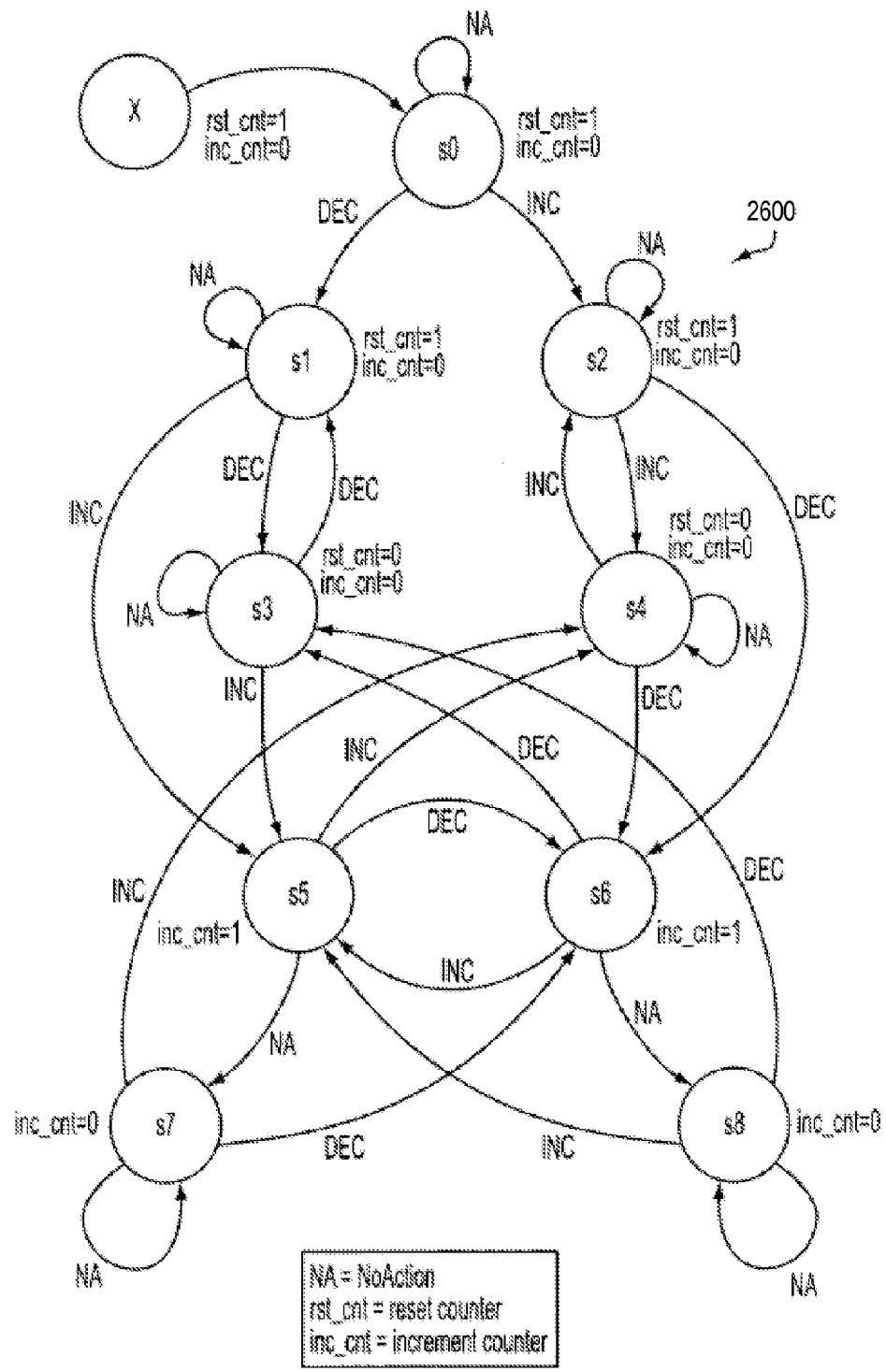
FIG. 26 is a diagram of an illustrative finite state machine that may be implemented by the phase alignment detection block of FIG. 23.

FIG. 26 illustrates a finite state machine 2600 that may be implemented by the PHAD block 2301 to control the illustrative two bit phok counter. The finite state machine 2600 as shown has a plurality of states x and s0 through s8. From all of these states, if a no action command is sensed (or if there is no increment or decrement command), then the state remains unchanged, with two exceptions that will be mentioned below. State x is an initialization state in which the phok counter is reset. Next, at state s0, if the PHAD block 2301 senses either a decrement command or an increment command, then the finite state machine 2600 goes to either state s1 or state s2, respectively. From state s1, if an increment command is sensed, then state s5 is entered and the phok counter is incremented, and if a decrement command is sensed, then state s3 is entered. Oppositely, from state s2, if a decrement command is sensed, then state s6 is entered and the phok counter is incremented, and if an increment command is sensed then state s4 is entered. In other words, only a series of two opposite commands (decrement, then increment; or increment, then decrement) will cause the phok counter to be incremented at this point. Assuming that this has happened, then at state s5 if a decrement command is sensed, then state s6 is entered and the phok counter is incremented. Oppositely, at state s6 if an increment command is sensed, then state s5 is entered and the phok counter is incremented. Thus, each time a decrement-increment or increment-decrement series of adjacent commands is sensed, the phok counter is incremented.

Now, assuming that the finite state machine 2600 is in state s3 (because two adjacent decrement commands have been issued), then if the next command is an increment command, state s5 is entered and the phok counter is incremented. On the other hand, if the next command is a decrement command, then state s1 is returned to and the phok counter is reset. Oppositely, if the finite state machine 2600 is in state s4 (because two adjacent increment commands have been issued), then a subsequent decrement command would cause state s6 to be entered and the phok counter incremented. On the other hand, if the next command is an increment command, then state s2 is returned to and the phok counter is reset. Thus, if three identical adjacent commands are issued, the phok counter is reset.

From state s5, if an increment command is sensed, then state s4 is entered. Oppositely, from state s6, if a decrement command is sensed, then state s3 is entered. Also, from state s5 or state s6, if a no action command is sensed (or if neither an increment nor decrement command is sensed), then state s7 or state s8 is entered, respectively. States s7 and s8 are exist in this embodiment to prevent the phok counter from being incremented in response to an explicit or implicit no action command (since remaining in states s5 and s6 would erroneously increment the phok counter). From state s7, a subsequent increment command would cause state s4 to be entered, or a subsequent decrement command would cause state s6 to be entered (and the phok counter incremented). Oppositely, from state s8, a subsequent decrement command would cause state s3 to be entered, or a subsequent increment command would cause state s5 to be entered (and the phok counter incremented).

Figure 24:
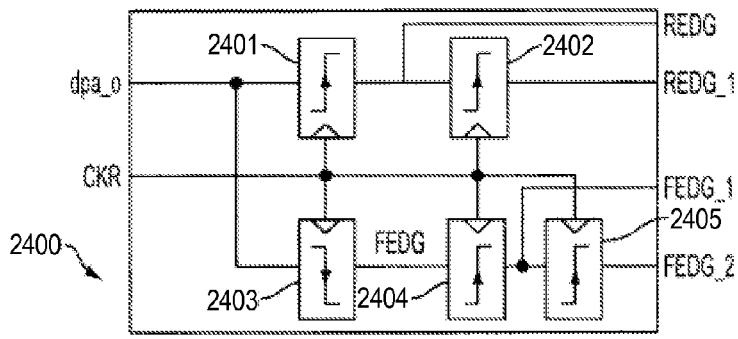
FIG. 24 is an illustrative circuit schematic diagram of the sampling generator included in the analyzer of FIG. 23.
Figure 25:
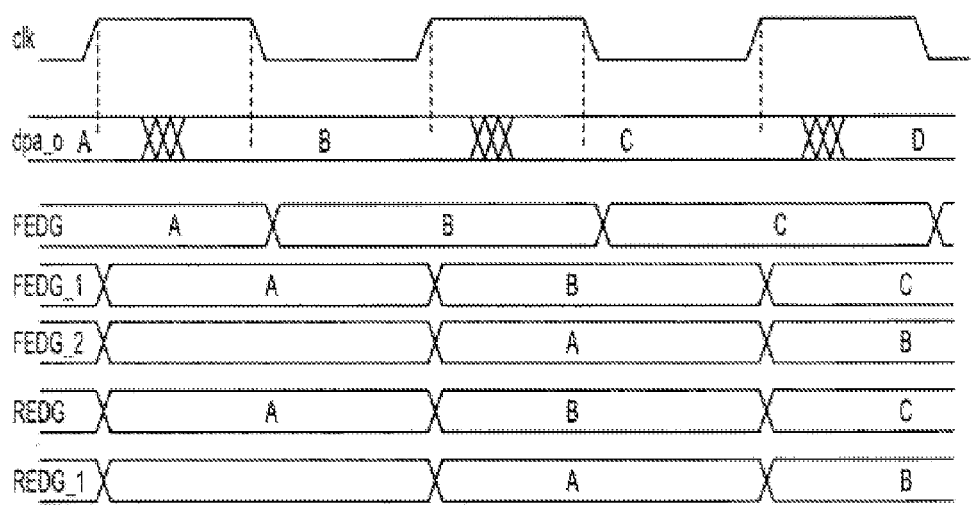
FIG. 25 is a set of illustrative waveforms of signals generated by the sampling generator of FIG. 24.

Referring to FIGS. 24 and 25, the analyzer 2302 may include a sample generator 2400 that generates REDG, REDG_1, FEDG_1, and FEDG_2 as described previously. The sample generator 2400 may include a plurality of registers 2401-2405. Registers 2401, 2402, 2404, and 2405 are shown as being clocked on active transition edges (in this example, rising edges) of CKR, while register 2403 is shown as being clock on inactive transition edges (in this example, falling edges) of CKR.

Figure 27:
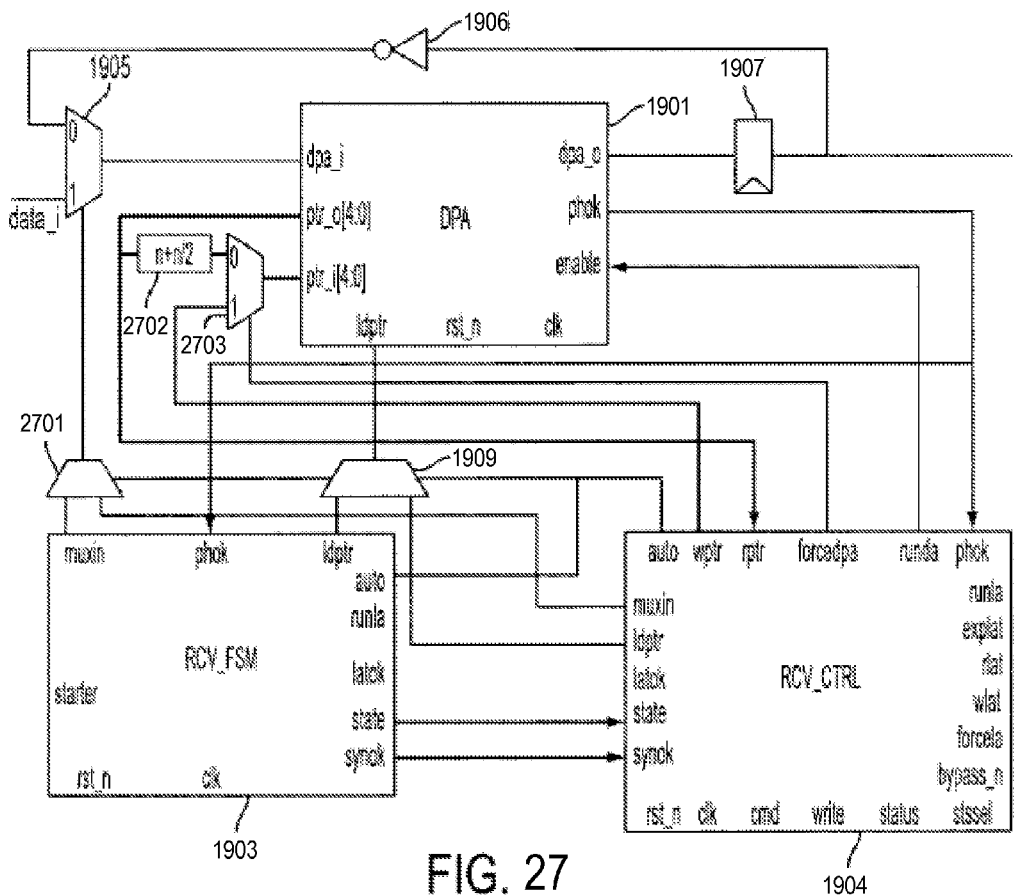
FIG. 27 is an illustrative circuit schematic diagram of how the digital phase alignment unit may be connected to the receiver finite state machine and receiver control units.
Figure 28:
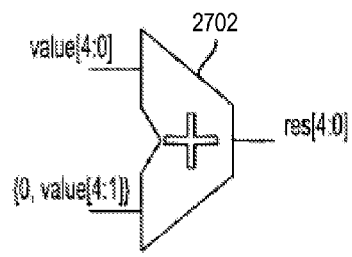
FIG. 28 is an illustrative circuit schematic diagram showing an adder for computing the value 0.75 T from the value 0.5 T.

Referring to FIG. 27, an illustrative interconnection of the digital phase adjustment unit 1901 with the receiver finite state machine unit 1903 and the receiver control unit 1904 is shown. The inverter 1906 is used as a loop back inverter that generates a signal synchronized on the active/rising transition edge of CKR. This is used to calculate an initial command to apply to the programmable delay 2001 based on known timing. As previously discussed, an initial default time delay may be applied at the beginning of synchronization. In this embodiment, that initial default time delay is 0.75T. The signal entering the inverter 1906 is known to be synchronized with the active/rising transition edge of CKR, and that synchronized signal is used at the input of the digital phase adjustment unit 1901, which the counter 2002 being reset to zero. The digital phase adjustment unit 1901 will delay this incoming data to align its transitions on the inactive/falling transition edge of CKR. Once aligned, whatever delay is applied is known to be 0.5T. The counter 2002 is then used to generate a 0.75T command as the initial delay command. Also included are a multiplexor 2701 that controls the multiplexor 1905, an adder 2702, and a multiplexor 2703 that selects between the output of the adder 2702 and a signal from the receiver control unit 1904. The adder 2702 is used to compute the five bit value 0.75T from the five bit value 0.5T, by adding n+0.5n, as shown in FIG. 28.

Figure 29:
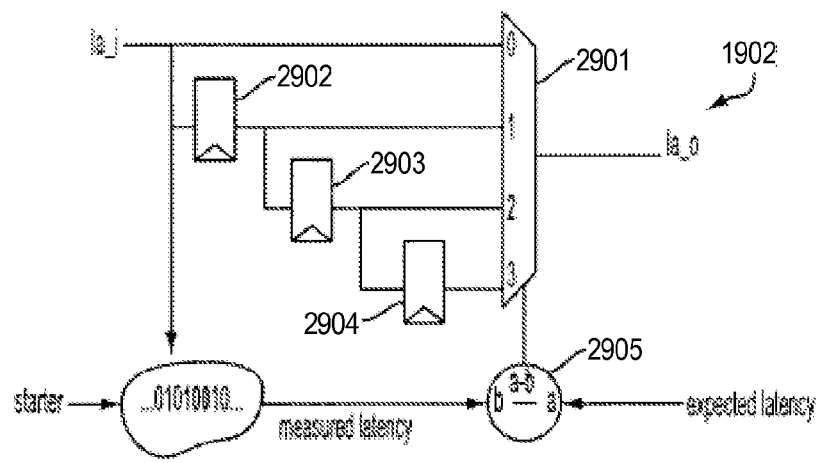
FIGS. 29-31 are illustrative circuit schematic diagrams of the latency adjustment unit of FIG. 19.
Figure 32:
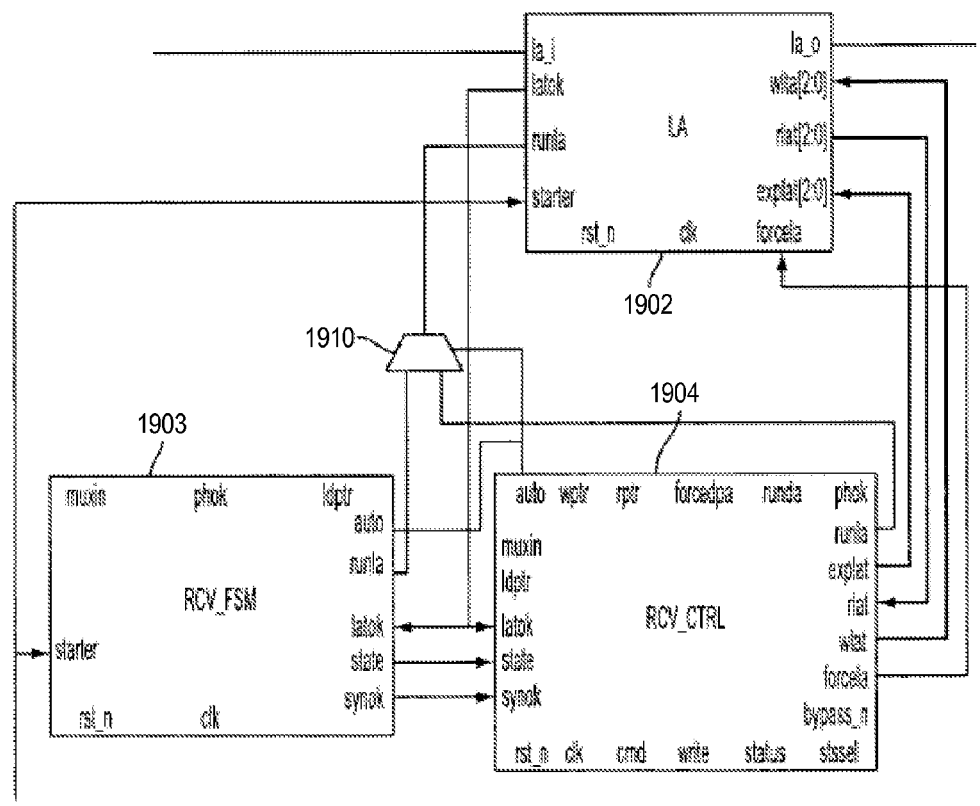
FIG. 32 is an illustrative circuit schematic diagram of how the latency adjustment unit may be connected to the receiver finite state machine and receiver control units.

Referring to FIG. 32, an illustrative interconnection of the latency adjustment unit 1902 with the receiver finite state machine unit 1903 and the receiver control unit 1904 is shown. As shown in FIG. 29, the latency adjustment unit 1902 may include, at a high level, an elastic FIFO buffer is formed from a multiplexor 2901 that selects from the outputs of one of a plurality of series-connected registers 2902, 2903, 2904. In this embodiment, the latency adjustment unit 1902 is configured to be able to compensate for up to a three-cycle different between the expected latency (specified at the system level) and the measured actual latency. As shown, the maximum possible expected latency would be seven cycles (represented by three bits), which at 200 MHz would be 35 ns. The latency adjustment unit 1902 may being measuring the latency from a starter signal up to the receipt of the latency adjustment pattern, which is this embodiment is {100}. The difference between the measured latency and the expected latency (as calculated by the differential control circuit 2905) provides the number of the registers 2902-2904 to add to the signal path.

Figure 30:
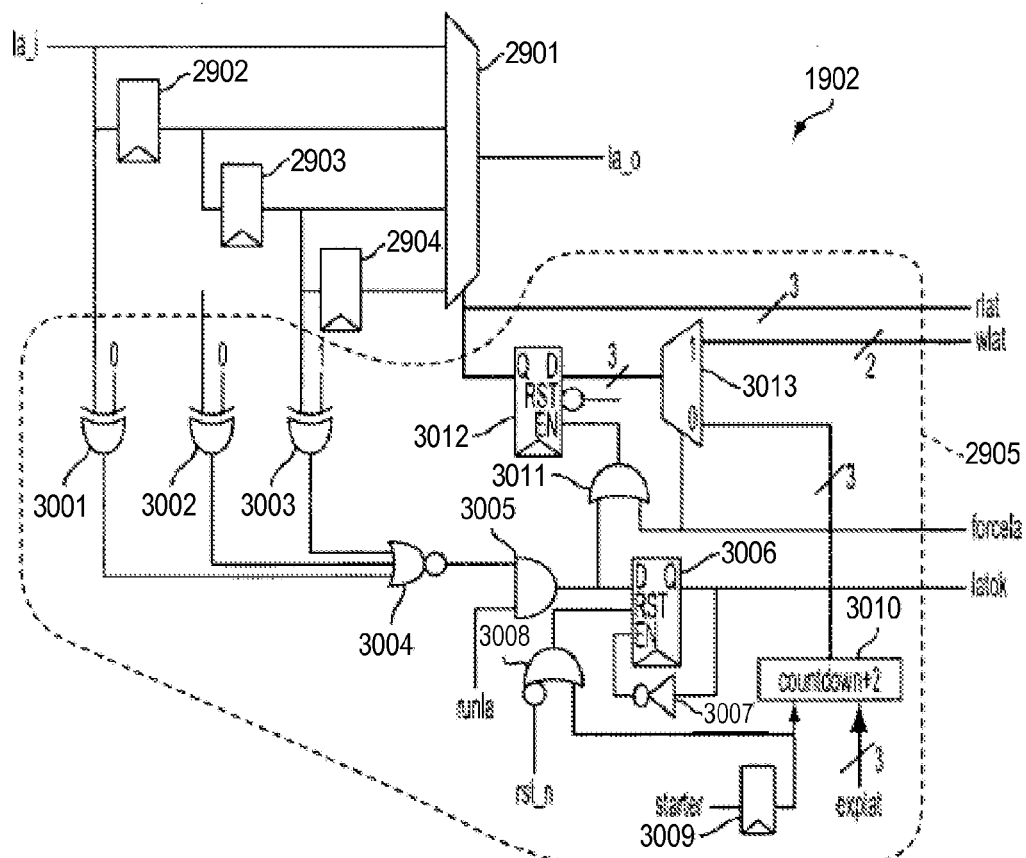

FIG. 30 shows the latency adjustment unit 1902 with the differential control circuit 2905 in more detail. The differential control circuit 2905 as shown may include a plurality of XOR gates 3001, 3002, 3003 each coupled to a storage cell, which each contains a different bit of the latency adjustment pattern. The outputs of the XOR gates 3001-3003 are fed into a NOR gate 3004. The output of the NOR gate 3004 is set to one only when the inputs to the three registers 2902-2904 match the three bits of the stored latency adjustment pattern. Thus, gates 3001-3004 together form a latency adjustment pattern detector. Assuming that signal forcela is set to zero, the output of the AND gate 3005 is forwarded via an OR gate 3011 to the clock enable of a register 3012. Also, assuming that signal runla is set to one, an AND gate 3005 forwards the output of the NOR gate 3004 to the input of a register 3006, which has an inverter 3006 feeding back into a clock enable input. The register 3006 may be reset by the starter signal via an OR gate 3008, which is controlled by an inverted rst_n signal, and a register 3009. The starter signal causes a latency counter 3010 to be set to the value of the expected latency explat.

Figure 31:
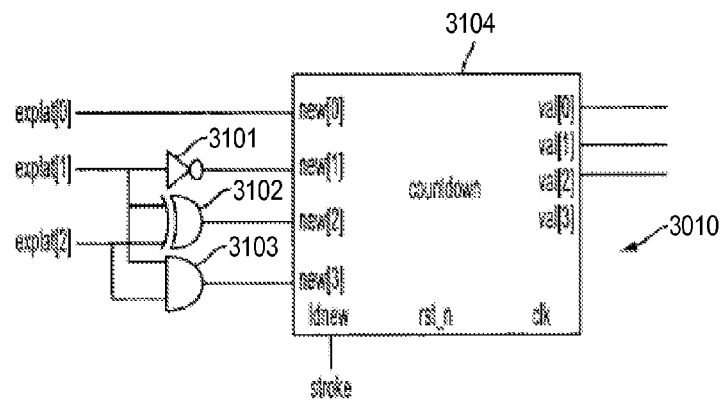

A multiplexor 3013 selects between either the output of the latency counter 3010 or signal wlat, depending upon the value of signal forcela. Assuming that signal forcela is set to zero, the output of the latency counter 3010 is sent to the data input of the register 3012. The register 3012 will forward the output of the counter 3010 to the control input of the multiplexor 2901 if the clock enable of the register 3012 is enabled. This occurs when the latency adjustment pattern detector 3001-3004 detects the latency adjustment pattern. Therefore, since the output of the latency counter 3010 is a three bit wide signal (in this example) that counts down with each cycle of CKR, the register 3012 locks in the value of the latency counter 3010 when the latency adjustment pattern is detected. The locked-in value of the latency counter 3010 identifies which output of the registers 2902-2904 should be used. FIG. 31 shows more detail of the latency counter 3010. In this embodiment, the latency counter 3010 has counting circuitry 3104 that counts down from the value explat+decimal 2. Gates 3101, 3102, and 3103 are used to add the value decimal 2 to explat. This accounts for the length of the particular adjustment pattern {100} used in the described embodiment. If a longer adjustment pattern were used, for example, such as {10000}, then decimal 4 would instead be added.

Figures 33, 34, 35:
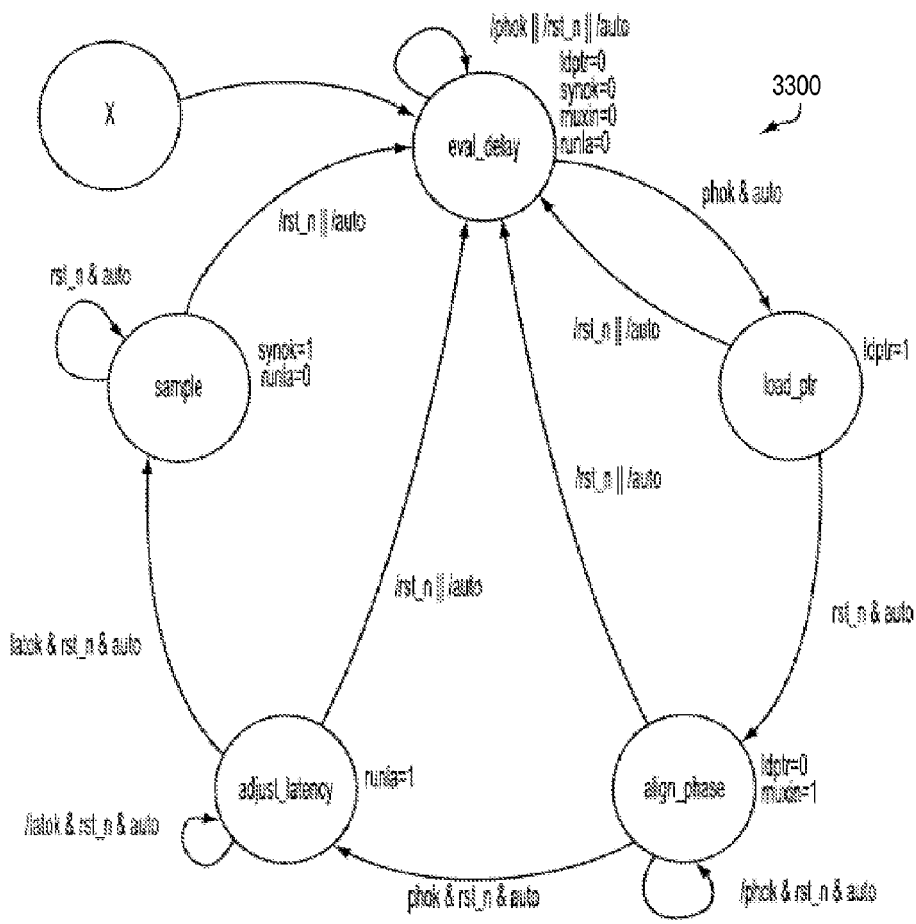
FIG. 33 is a diagram of an illustrative finite state machine that may be implemented by the receiver finite state machine unit of FIG. 19.
FIG. 34 is a diagram of an illustrative control register format that may be used by the receiver control unit of FIG. 19.
FIG. 35 is a diagram of an illustrative status format that may be used by the receiver control unit of FIG. 19.

The receiver control unit 1904 is an interface used to program and control the receiver circuit 1900 and to read its state. The control of the receiver circuit 1900 may be performed via a control register, such as a sixteen-bit control register. In the present embodiment, the control register is written with a sixteen-bit 'cmd' input and a validation signal 'write.' Selection between the receiver circuit 1900 state and the control register is implemented in accordance with a signal 'stssel' (STatuS SELection). FIG. 34 illustrates a possible format for the control register (where stssel is set to one), and Table 8 explains each portion of the format.

TABLE 8

| | |
|---|---|
| BP_N | Bypass Mode |
| | 0: The synchronization mechanism is used. |
| | 1: The synchronization mechanism is bypassed (default). |
| RLA | Run LA |
| | 0: Functional mode (default). |
| | 1: LA measures latency. Assumes that latency adjustment pattern is sent and that a starter signal exists. |
| FLA | Force LA |
| | 0: Buffer depth value derived from automatic measurement (default). |
| | 1: Buffer depth value forced by WEXPLAT. |
| WEXPLAT | Write or expected latency |
| | if FLA = 0: Expected latency assumed. |
| | if FLA = 1: Forced buffer depth assumed (only two last bits), reset to binary 000. |
| RDPA | Run DPA |
| | 0: Phase comparator is disabled, and no INC/DEC command will modify the programmable delay (default). |
| | 1: Phase comparator is enabled and orders are sent to the programmable delay. |
| FDPA | Force DPA |
| | 0: Select current value multiplied by ½ (default). |
| | 1: Select user value WPTR |
| LPTR | Load pointer |
| | 0: Prevent pointer from loading new value (default). |
| | 1: Write new value (defined by FDPA and WPTR) in pointer. |
| WPTR | Value to write into pointer, and reset to binary 0000. |
| MUXIN | Select input of DPA |
| | 0: Inverted pipelined output of DPA, used for process evaluation. |
| | 1: Standard input (default). |
| AUTO | Select manual or automatic calibration |
| | 0: Fully manual (default). |
| | 1: Automatic. Synchronization is managed by RCV_FSM. To work properly, RDPA should be set to binary 1, FDPA should be set to binary 0, and WEXPLAT should be set to the expected latency. |

An illustrative status format (where stssel is set to zero) is shown in FIG. 35, supplemented with an explanation of each portion of the status format in Table 9.

TABLE 9

| | |
|---|---|
| SYNOK | Synchronization OK. Send by RCV_FSM. |
| | 0: The FSM is still synchronizing. |
| | 1: Functional mode, the receiver is synchronized. |
| LATOK | Latency adjustment OK. |
| | 0: LA is not running (RLA is 0) or LA is still waiting for latency adjustment pattern |
| | 1: LA has received latency adjustment pattern |
| PHOK | Phase alignment OK. |
| | 0: The input signal is not aligned with the local clock. |
| | 1: The input signal is aligned with the local clock. |
| FSM_STATE | FSM current state. |
| RLAT | Current buffer depth added by LA. |
| | RLAT − (expected latency) = latency of the link. |
| RPTR | Current pointer that controls the programmable delay. |

The finite state machine 3300 manages synchronization when an automatic calibration mode is enabled, and begins when the auto signal is set to one. Table 10 shows an illustrative set of interface signals for the receiver finite state machine unit 1903.

TABLE 10

| | |
|---|---|
| data_i | Input data from emitter chip |
| data_o | Output data from receiver circuit with or without synchronization |
| cmd | Data to write in the control register |
| write | Write the input 'cmd' in the control register |
| status | Outputs either the state of the receiver or the control register |
| stssel | When 0: selects the state of the receiver on 'status.' When 1: selects the control register on 'status' |
| CKR | Clock at transport frequency |
| starter | A pulse that starts the measurement of latency when released to zero and when the latency adjustment unit is running |
| rst_n | Synchronous reset (active low) |

Referring to FIG. 33, a finite state machine 3300 is shown that may illustratively be implemented by the receiver finite state machine unit 1903. The finite state machine 3300 has initial state x, along with states eval_delay, load_ptr, align_phase, adjust_latency, and sample. At state eval_delay, the following occurs: pointer ptr is prevented from loading a new value (ldptr is set to zero), the receiver circuit 1900 is considered to still be synchronizing (synok is set to zero), the digital phase adjustment unit's 1901 inverted pipelined output is used via the loop-back inverter 1906 (muxin is set to zero), and the latency adjustment unit 1902 is set to functional mode (runla is set to zero). If synchronous reset rst_n is inactive (set to one), the input signal is aligned with local clock CKR (phok is set to one), and automatic calibration mode is set (auto is set to one), then the finite state machine 3300 moves to state load_ptr. Otherwise, the finite state machine 3300 remains in state eval_delay.

At state load_ptr, ldptr is set to one, meaning that a new value defined by fdpa and wptr is to be written into pointer ptr. From the load_ptr state, the finite state machine 3300 moves to state align_phase if synchronous reset rst_n is inactive (set to one) and automatic calibration mode is set (auto is set to one). But, if either synchronous reset rst_n is active (set to zero) or manual calibration mode is set (auto is set to zero), then the finite state machine 3300 back to state eval_delay.

At state align_phase, ldptr is set to zero, meaning that pointer ptr is prevented from loading a new value, and muxin is set to one, meaning that the standard data_i input is used into the digital phase adjustment unit 1901. From state align_phase, if the input signal is aligned with local clock CKR (phok is set to one), the synchronous reset rst_n is inactive (set to one), and automatic calibration mode is being used (auto is set to one), then the finite state machine 3300 moves to the adjust_latency state. However, if the synchronous reset rst_n is activated (set to zero) and manual calibration mode is being used (auto is set to zero), then the finite state machine 3300 moves back to the eval_delay state.

At the adjust_latency state, the latency adjustment unit 1902 is set to measure latency (runla is set to one). From the adjust_latency state, if the latency adjustment unit 1902 has received the latency adjustment pattern (latok is set to one), the synchronous reset is inactive (rst_n is set to one), and automatic calibration mode is being used (auto is set to one), then the finite state machine 3300 moves to the sample state. However, if either the synchronous reset is activated (rst_n is set to zero) or the manual calibration mode is used (auto is set to zero), then the finite state machine 3300 moves back to the eval_delay state.

At the sample state, the receiver circuit 1900 is set to functional mode (synok is set to one) and the latency adjustment unit 1902 is set to functional mode (runla is set to zero). From the sample state, if the synchronous reset is activated (rst_n is set to zero) and manual calibration mode is used (auto is set to zero), then the finite state machine 3300 moves back to the eval_delay state.

Referring now to FIGS. 36 through 44, various illustrative calibration protocols between the emitter chip 101 and the receiver chip 102 are shown. For example, to use bypass mode, the emitter circuit 1800 in the emitter chip 102 is set to functional mode (Table 7), and the receiver circuit 1900 is set to bypass mode (Table 8), as shown in FIG. 36. To use automatic synchronization, the periodic starter signal is activated, and the emitter circuit 1800 is set to synchronization mode (Table 7). The receiver circuit 1800 in the receiver chip 102 is set to automatic mode (Table 8), the bypass mode is removed, and the expected latency is specified, as shown in FIG. 38. Then, after the SYNOK flag is set to one, set the emitter circuit 1800 to functional mode.

To use manual synchronization, activate the periodic starter signal and set the emitter in synchronization mode (Table 7). Remove the bypass mode and the automatic mode, and initialize the pointer ptr to zero, as shown in FIG. 38. Then, run process evaluation as shown in FIG. 39. Wait for the PHOK flag to be set to one, and then load the 0.75T value into the pointer ptr and begin aligning the input signal, as shown in FIG. 40. Then, run phase alignment as shown in FIG. 41, and wait for the PHOK flag to be set to one. Then, provide the receiver circuit 1800 with the expected latency and run latency adjustment, as shown in FIG. 42. Wait for the LATOK flag to be set to one, and then lock the latency adjustment, as shown in FIG. 43. Finally, set the emitter circuit 1800 to functional mode (Table 7).

To cause the latency adjustment unit 1902 to measure the latency of a link, activate the periodic starter signal and set the emitter in synchronization mode (Table 7). Remove the bypass mode and the automatic mode, and initialize the pointer ptr to zero, as shown in FIG. 38. Then, run process evaluation as shown in FIG. 39. Wait for the PHOK flag to be set to one, and then load the 0.75T value into the pointer ptr and begin aligning the input signal, as shown in FIG. 40. Then, run phase alignment as shown in FIG. 41, and wait for the PHOK flag to be set to one. Provide the receiver circuit 1900 with an expected latency of seven (for example) and run the latency adjustment process, as shown in FIG. 44. Then, wait for the LATOK flag to be set to one, and read the RLAT value. This value provides the difference between the expected value (in this case, binary 111) and the measure value. The latency of the link can then be calculated by WEXPLAT−RLAT=link latency.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. In addition, the invention has been defined using the appended claims, however these claims are exemplary in that the invention is intended to include the elements and steps described herein in any combination or sub combination. It will also be appreciated and understood that modifications may be made without departing from the true spirit and scope of the invention.

What is claimed is:

1. A method for synchronizing incoming data received by a chip, comprising steps of:

first sampling the incoming data on an active transition edge of a first cycle of a clock to produce a sample A;

second sampling the incoming data on the active transition edge of a second cycle of the clock, the second cycle being previous to the first cycle to produce a sample B;

third sampling the incoming data on an inactive transition edge of the second cycle of the clock to produce a sample C;

fourth sampling the incoming data on the inactive transition edge of a third cycle of the clock, the third cycle being previous to the second cycle to produce a sample D; and delaying the incoming data by an amount depending upon A, B, C, and D.

2. The method of claim 1, wherein the active transition edges are rising edges.

3. The method of claim 1, wherein the step of delaying includes delaying the incoming data by such an amount that transition edges of the incoming data occur in synchronization with the inactive transition edges of the clock.

4. The method of claim 1, wherein the step of delaying includes sequentially incrementing, decrementing, or maintaining the amount of delay for each of a plurality of cycles of the clock.

5. The method of claim 4, wherein incrementing and decrementing are performed in steps of $\frac{1}{16}$ of the clock cycle.

6. The method of claim 4, wherein incrementing and decrementing are performed in steps of $\frac{1}{32}$ of the clock cycle.

7. The method of claim 1, further including a step of initially delaying the incoming data by an initial amount prior to the step of delaying, the initial amount depending upon a length of the clock cycle.

8. The method of claim 1, further including a step of initially delaying the incoming data by an initial amount of approximately 0.75 of the clock cycle prior to the step of delaying.

9. The method of claim 1, wherein the step of delaying includes decrementing the amount of delay responsive to ABCD equaling 1000, 0111, X010, X101, X100, or X011, and incrementing the amount of delay responsive to ABCD equaling X110 or X001.

10. The method of claim 9, wherein the step of delaying further includes maintaining the amount of delay responsive to ABCD equaling 0000 or 1111.

11. A circuit for measuring synchronization of incoming data to a chip in comparison with a clock, comprising:
a first register having an input coupled to the incoming data and an output, and configured to temporarily hold at the output a value of the incoming data received at active transition edges of the clock;
a second register having an input coupled to the incoming data and an output, and configured to temporarily hold at the output a value of the incoming data received at inactive transition edges of the clock;
a third register having an input coupled to the output of the first register and an output, and configured to temporarily hold at the output a value of the output of the first register received at active transition edges of the clock;
a fourth register having an input coupled to the output of the second register and an output, and configured to temporarily hold at the output a value of the output of the second register received at active transition edges of the clock; and
a fifth register having an input coupled to the output of the fourth register and an output, and configured to temporarily hold at the output a value of the output of the fourth register received at active transition edges of the clock.

12. The circuit of claim 11, further including a delay circuit portion configured to delay the incoming data and to alter the delay of the incoming data depending upon the outputs of the first, third, fourth, and fifth registers.

13. The circuit of claim 11, further including a delay circuit portion configured to delay the incoming data and to increment, decrement, or maintain the delay of the incoming data depending upon the outputs of the first, third, fourth, and fifth registers.

14. A system on a chip for synchronizing incoming data with a clock, comprising:
a sampling portion configured to sample the incoming data at transition edges of the clock and to provide outputs based on the incoming data;
a decision portion coupled to the sampling portion and configured to make sequential decisions as to whether to increase, decrease, or maintain the delay amount based on the outputs of the sampling portion;
a smoothing portion coupled to the decision portion and configured to increase, decrease, or maintain the delay amount based on at least two of the sequential decisions made by the decision portion; and
a programmable delay portion coupled to the decision portion and the smoothing portion and configured to delay the incoming data by the delay amount.

15. A receiver circuit on a chip, comprising:
a digital phase adjustment unit configured to adjust a delay of incoming data to the chip, the digital phase adjustment unit periodically increasing and decreasing the delay depending upon values of the incoming data at transition edges of a clock;
a latency adjustment unit coupled to the digital phase adjustment unit, configured to adjust for a difference between an expected latency of the incoming data and an actual latency of the incoming data; and
a controller configured to control operations of the digital phase adjustment unit and the latency adjustment unit,
wherein the digital phase adjustment unit includes a sampler configured to sample the values of the incoming data at an active transition edge of a first cycle of the clock to produce a value A, at an active transition edge of a second cycle of the clock, the second cycle being previous to the first to produce a value B, at an inactive transition edge of the second cycle of the clock to produce a value C, and at an inactive transition edge of a third cycle of the clock, the third cycle being previous to the second cycle to produce a value D, wherein the digital phase adjustment circuit increases and decreases the delay based on the values A, B, C, and D.

16. The receiver circuit of claim 15, further including a feedback loop between an output and an input of the digital phase adjustment unit, the digital phase adjustment unit using the feedback loop to determine an initial amount of the delay.

17. The receiver circuit of claim 16, wherein the initial amount of delay depends upon a period of the clock.

18. The receiver circuit of claim 16, wherein the initial amount of delay is approximately 0.75 of a period of the clock.

19. The receiver circuit of claim 15, wherein the controller is configured to send a message to the latency adjustment unit, the message including a value of the expected latency.

20. The receiver circuit of claim 15, wherein the digital phase adjustment unit includes a pointer that points to an amount of the delay, the pointer moving as the delay is increased and decreased.

21. The receiver circuit of claim 15, wherein the controller is configured to control the digital phase adjustment unit to generate an initial amount of the delay and to control the latency adjustment unit to adjust for latency.

22. A system on a chip for synchronizing incoming data with a clock, comprising:
- a sampling portion configured to sample the incoming data at an active transition edge of a first cycle of the clock to produce a first value, at an active transition edge of a second cycle of the clock, the second cycle being previous to the first cycle to produce a second value, at an inactive transition edge of the second cycle of the clock to produce a third value, and at an inactive transition edge of a third cycle of the clock, the third cycle being previous to the second cycle to produce a fourth value;
- a decision portion coupled to the sampling portion and configured to decide whether to increase, decrease, or maintain the delay amount based on the first, second, third, and fourth values; and
- a programmable delay portion coupled to the decision portion and configured to delay the incoming data by the delay amount.

* * * * *